(12) United States Patent
Huang et al.

(10) Patent No.: US 9,535,220 B2
(45) Date of Patent: Jan. 3, 2017

(54) FIBER PATCH CORD APPARATUS, PORT PANEL, AND FIBER PATCH CORD SYSTEM

(71) Applicant: Huawei Technologies Co., Ltd., Shenzhen (CN)

(72) Inventors: Xuesong Huang, Shenzhen (CN); Hui Bie, Shenzhen (CN); Bo Yang, Wuhan (CN); Yali Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/082,348

(22) Filed: Mar. 28, 2016

(65) Prior Publication Data

US 2016/0209597 A1 Jul. 21, 2016

Related U.S. Application Data

(63) Continuation of application No. PCT/CN2014/075557, filed on Apr. 17, 2014.

(30) Foreign Application Priority Data

Nov. 5, 2013 (CN) .......................... 2013 1 0542868

(51) Int. Cl.
*G02B 6/28* (2006.01)
*G02B 6/35* (2006.01)
(Continued)

(52) U.S. Cl.
CPC ........... *G02B 6/3502* (2013.01); *G02B 6/3574* (2013.01); *G02B 6/3898* (2013.01); *G02B 6/4452* (2013.01); *G02B 6/3893* (2013.01)

(58) Field of Classification Search
CPC ... G02B 6/3502; G02B 6/3574; G02B 6/4452; G02B 6/3898; G02B 6/3893
(Continued)

(56) References Cited

U.S. PATENT DOCUMENTS 5,129,842 A * 7/1992 Morgan ................. H01R 13/73
439/532
5,386,485 A 1/1995 Saito et al.
(Continued)

FOREIGN PATENT DOCUMENTS

CN 201773203 U 3/2011
CN 202133808 U 2/2012
(Continued)

OTHER PUBLICATIONS

Foreign Communication From a Counterpart Application, PCT Application No. PCT/CN2014/075557, English Translation of International Search Report dated Aug. 13, 2014, 2 pages.
(Continued)

*Primary Examiner* — Ellen Kim
(74) *Attorney, Agent, or Firm* — Conley Rose, P.C.

(57) ABSTRACT

A fiber patch cord apparatus and a port panel, which may simplify a structure of the fiber patch cord system. The fiber patch cord apparatus includes a crawler configured to move to a corresponding position of a source adapter port along a crawling guide rail provided by a port panel, a clamper configured to clamp a fiber patch cord on the source adapter port, and a puller and inserter configured to pull the fiber patch cord out of the source adapter port and a controller that is configured to control the fiber patch cord apparatus to move on a crawling guide rail, where the controller is further configured to control a mold strip group on the port panel to move. The embodiments of the present invention are used to pull and insert a fiber patch cord.

6 Claims, 24 Drawing Sheets

(51) Int. Cl.
 *G02B 6/44* (2006.01)
 *G02B 6/38* (2006.01)
(58) Field of Classification Search
 USPC .................................. 385/22, 24, 134, 135
 See application file for complete search history.

(56) References Cited

U.S. PATENT DOCUMENTS

| | | | | |
|---|---|---|---|---|
| 5,613,021 | A * | 3/1997 | Saito | G02B 6/3502 385/135 |
| 5,775,755 | A * | 7/1998 | Covert | B25J 15/0226 294/100 |
| 7,513,776 | B1 * | 4/2009 | Chen | H01R 29/00 439/54 |
| 8,018,725 | B2 * | 9/2011 | Pepe | H04Q 1/06 361/725 |
| 8,153,893 | B2 * | 4/2012 | McSorley | H05K 7/186 174/50 |
| 8,175,425 | B2 * | 5/2012 | Chen | G02B 6/3508 385/134 |
| 8,939,792 | B2 * | 1/2015 | Takeuchi | H01R 13/58 439/571 |
| 2002/0118926 | A1 * | 8/2002 | Shimoji | G02B 6/3821 385/76 |
| 2005/0111810 | A1 | 5/2005 | Giraud et al. | |
| 2010/0046885 | A1 * | 2/2010 | Chen | G02B 6/3508 385/22 |
| 2010/0054659 | A1 * | 3/2010 | Pnini | G02B 6/35 385/16 |
| 2010/0220953 | A1 | 9/2010 | Kewitsch et al. | |
| 2011/0044598 | A1 * | 2/2011 | Srutkowski | G02B 6/4452 385/135 |
| 2013/0196538 | A1 * | 8/2013 | Takeuchi | H01R 13/58 439/571 |

FOREIGN PATENT DOCUMENTS

| | | |
|---|---|---|
| CN | 202693855 U | 1/2013 |
| CN | 203117499 U | 8/2013 |
| EP | 1870750 A2 | 12/2007 |
| WO | 2013004488 A1 | 1/2013 |

OTHER PUBLICATIONS

Foreign Communication From a Counterpart Application, PCT Application No. PCT/CN2014/075557, English Translation of Written Opinion dated Aug. 13, 2014, 4 pages.
Foreign Communication From a Counterpart Application, European Application No. 14860142.0, Extended European Search Report dated Aug. 31, 2016, 9 pages.

* cited by examiner

FIBER PATCH CORD APPARATUS, PORT PANEL, AND FIBER PATCH CORD SYSTEM

CROSS-REFERENCE TO RELATED APPLICATIONS

This application is a continuation of International Application No. PCT/CN2014/075557, filed on Apr. 17, 2014, which claims priority to Chinese Patent Application No. 201310542868.X, filed on Nov. 5, 2013, both of which are hereby incorporated by reference in their entireties.

TECHNICAL FIELD

The present disclosure relates to the field of communications, and in particular, to a fiber patch cord apparatus, a port panel, and a fiber patch cord system.

BACKGROUND

Fiber to the X (FTTX) refers to connecting an optical fiber to an actual scenario, where x may be H, that is, fiber to the home (FTTH), or x may be P, that is, fiber to the premises (FTTP), or x may be O, that is, fiber to the office (FTTO), or another scenario. Before a large quantity of FTTX networks are built or after a large quantity of FTTX networks are built, massive optical fibers on an FTTX network need to be maintained and managed, for example, in procedures of initial building of an FTTX network, provisioning of a newly-added user service, and an optical fiber troubleshooting service, operations such as diagnosis, locating, patching, detection, recording, and refreshing need to be performed on a network port connected to an optical fiber, and the operations are very frequent. However, after an optical fiber maintenance command is received, patching cannot be accurately performed on an optical fiber in time during a manual patching operation, and there are defects in aspects of accuracy, timeliness, and simplicity of optical fiber maintenance.

In the prior art, a fiber patch cord system includes a fiber distribution terminal, a port panel, a robotic arm, where the port panel and the robotic arm are located inside the fiber distribution terminal, and the port panel may be a two-dimensional port panel. Several adapter ports are disposed along a row direction and a column direction according to a space size of the fiber distribution terminal, where the row direction is a direction parallel to a placement surface when the fiber distribution terminal is normally placed, and the column direction is a direction perpendicular to the placement surface when the fiber distribution terminal is normally placed, and then the robotic arm may be used to move through the two-dimensional port panel, and the robotic arm may be moved to a specified adapter port to perform pulling, insertion, and patching of an optical fiber. However, when a column needs to be changed, a group of single-shaft column change and movement modules is further needed to drive the entire robotic arm to complete a column change action, and the robotic arm is relatively long and is not telescopic, which increases a volume of the fiber distribution terminal. The port panel may also be changed to be of a space matrix structure. In a row direction of a matrix, one robot is disposed to control and complete pulling, insertion, and patching of an optical fiber in the row direction, and in a column direction of the matrix, one robot further needs to be disposed to control and complete pulling, insertion, and patching of an optical fiber in the column direction. In this way, not only movement control is complex, but also the robots occupy relatively large space of the fiber distribution terminal, leading to a decrease in adapter ports disposed on the port panel of the fiber distribution terminal. Therefore, the fiber patch cord system has a complex structure.

SUMMARY

Embodiments of the present disclosure provide a fiber patch cord apparatus, a port panel, and a fiber patch cord system, which can simplify a structure of the fiber patch cord system.

To achieve the foregoing objective, the following technical solutions are used in the embodiments of the present disclosure.

According to a first aspect, a fiber patch cord apparatus is provided, including a crawling unit configured to move to a corresponding position of a source adapter port along a crawling guide rail provided by a port panel, a clamping unit configured to clamp a fiber patch cord on the source adapter port, and a pulling and insertion unit configured to pull the fiber patch cord out of the source adapter port, where the crawling unit is further configured to move to a corresponding position of a target adapter port along the crawling guide rail provided by the port panel. The pulling and insertion unit is further configured to insert the fiber patch cord into the target adapter port, and the fiber patch cord apparatus is located on the port panel, the crawling guide rail is formed by connecting a sub guide rail on a first mold strip to a sub guide rail on at least one mold strip adjacent to the first mold strip in a second direction, the first mold strip is any mold strip in at least two mold strip groups arranged in an array on the port panel along a first direction, each of the mold strip groups can move along the first direction, each of the mold strip groups includes at least two mold strips arranged in an array along the second direction, an adapter port is disposed on each of the mold strips, and the second direction is perpendicular to the first direction.

With reference to the first aspect, in a first implementable manner, the crawling unit includes a crawling gear, where the crawling gear can be engaged with a drive rack arranged in an array on the crawling guide rail along the second direction, a sliding structure, where the sliding structure is connected to the crawling gear, the sliding structure is in contact with a guiding guide rail on the crawling guide rail, and a guiding direction of the guiding guide rail is parallel to the second direction, a drive worm, and a crawling motor, where the crawling motor is connected to the crawling gear using the drive worm and is configured to drive the crawling gear to be engaged with the drive rack, and drive the sliding structure to move along the guiding direction of the guiding guide rail.

With reference to the first implementable manner, in a second implementable manner, the sliding structure includes at least two ball groups, where balls in each of the ball groups are arranged in a linear array along the second direction, and a first elastic element connected to the ball is disposed corresponding to any ball in a first ball group, such that the ball is in elastic contact with the guiding guide rail, where the first ball group is at least one ball group in the two ball groups.

With reference to the first aspect, in a third implementable manner, the clamping unit includes a clamping element, where the clamping element is provided with a screw hole and a first opening that has a chamfer, a bolt, where the bolt is connected to the clamping element using the screw hole, a clamping motor, where the clamping motor drives, using the bolt, the clamping element to move along a direction parallel to the second direction, and a clamping jaw, where a second elastic element is disposed on the clamping jaw, the second elastic element provides an elastic force parallel to the first direction for the clamping jaw, and the clamping element is sleeved on the clamping jaw by means of the first opening, where when the clamping element moves along the direction parallel to the second direction to make a contact area between the first opening and the clamping jaw gradually increase, the clamping jaw is driven by an elastic force of the first opening to perform clamping, or when the clamping element moves along the direction parallel to the second direction to make a contact area between the first opening and the clamping jaw gradually decrease, the clamping jaw is driven by an elastic force of the first opening to spread.

With reference to the third implementable manner, in a fourth implementable manner, the pulling and insertion unit includes a sliding element, where the sliding element is connected to the clamping jaw, a rotating shaft, where the rotating shaft is connected to the sliding element, a first bevel gear, where the first bevel gear is connected to the rotating shaft, a second bevel gear, where the second bevel gear is engaged with the first bevel gear, and a pulling and insertion motor, where the pulling and insertion motor is connected to the first bevel gear using the second bevel gear, and is configured to drive the second bevel gear to be engaged with the first bevel gear, and drive the rotating shaft to rotate in order to enable the sliding element to slide on the rotating shaft, thereby driving the clamping jaw connected to the sliding element to pull or insert, along a third direction, the fiber patch cord, where the third direction is a direction perpendicular to a plane constituted by the first direction and the second direction.

With reference to the first aspect, in a fifth implementable manner, the fiber patch cord apparatus includes a radio frequency identification read head configured to read information about a radio frequency identification label on a fiber patch cord of an adapter port on the mold strip group.

With reference to the first implementable manner, in a sixth implementable manner, crawling motor is connected to the controller, and is configured to receive crawling path information sent by the controller and control, according to the crawling path information, the fiber patch cord apparatus to move on the crawling guide rail.

According to a second aspect, a port panel is provided, including at least two mold strip groups arranged in an array along a first direction and at least two guide posts, where each of the guide posts is connected to the mold strip group, to enable the mold strip group to move along the first direction using the guide post, where each of the mold strip groups includes at least two mold strips arranged in an array along a second direction, where the second direction is perpendicular to the first direction, and an adapter port is disposed on each of the mold strips, a sub guide rail is disposed at a first position of each of the mold strips, and a guiding direction of the sub guide rail is parallel to the second direction, where a crawling guide rail is formed by connecting a sub guide rail on a first mold strip to a sub guide rail on at least one mold strip adjacent to the first mold strip in the second direction, such that a fiber patch cord apparatus can move along the crawling guide rail, and the first mold strip is any mold strip in the at least two mold strip groups.

With reference to the second aspect, in a first implementable manner, of the sub guide rails includes a guiding guide rail configured to guide the fiber patch cord apparatus, where a guiding direction of the guiding guide rail is parallel to the second direction, and a drive rack, arranged in an array along the second direction, and configured to engage with a drive gear of the fiber patch cord apparatus, to enable the fiber patch cord apparatus to move along the guiding direction of the guiding guide rail.

With reference to the first implementable manner, in a second implementable manner, a network port is disposed on each of the mold strip groups, and the mold strip group is connected to a controller using the network port, and moves along the first direction according to control information of the controller.

With reference to the second implementable manner, in a third implementable manner, distance by which each of the mold strip groups moves is less than a length of each of the mold strip groups that moves along the first direction.

According to a third aspect, a fiber patch cord system is provided, including any fiber patch cord apparatus described above, any port panel described above, a controller configured to control the fiber patch cord apparatus to move on a crawling guide rail, where the controller is further configured to control a mold strip group on the port panel to move, and a fiber distribution terminal configured to protect the fiber patch cord apparatus, the port panel, and the controller.

The embodiments of the present disclosure provide a fiber patch cord apparatus, a port panel, and a fiber patch cord system. The fiber patch cord apparatus includes a crawling unit configured to move to a corresponding position of a source adapter port along a crawling guide rail provided by a port panel, a clamping unit configured to clamp a fiber patch cord on the source adapter port, and a pulling and insertion unit configured to pull the fiber patch cord out of the source adapter port, where the pulling and insertion unit is further configured to insert the fiber patch cord into the target adapter port. The fiber patch cord system includes a fiber patch cord apparatus, a port panel, and a controller that is configured to control the fiber patch cord apparatus to move on a crawling guide rail, where the controller is further configured to control a mold strip group on the port panel to move. In this way, the fiber patch cord apparatus and the port panel coordinate with each other, such that a structure of the fiber patch cord system by which a fiber patch cord is automatically pulled out of and inserted into an adapter port disposed on the port panel is simplified.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiments of the present disclosure provide a fiber patch cord system, including a fiber distribution terminal, a fiber patch cord apparatus, a port panel, and a controller. The fiber patch cord apparatus, the port panel, and the controller are located inside the fiber distribution terminal, the fiber patch cord apparatus is located on the port panel, and the fiber patch cord apparatus is configured to move to a corresponding position of a source adapter port along a crawling guide rail provided by the port panel, clamp a fiber patch cord on the source adapter port, and pull the fiber patch cord out of the source adapter port, or insert the fiber patch cord into the target adapter port, where the source adapter port is an adapter port on which the fiber patch cord that needs to be pulled out is located, and the target adapter port is an adapter port into which the fiber patch cord needs to be inserted. The port panel is configured to provide the crawling guide rail for the fiber patch cord apparatus. The controller is configured to control the fiber patch cord apparatus to move on the crawling guide rail, the controller is connected to the fiber patch cord apparatus and the port panel, and the controller is configured to control the fiber patch cord apparatus to move on the crawling guide rail, and the controller is further configured to control a mold strip group on the port panel to move.

Figure 1:
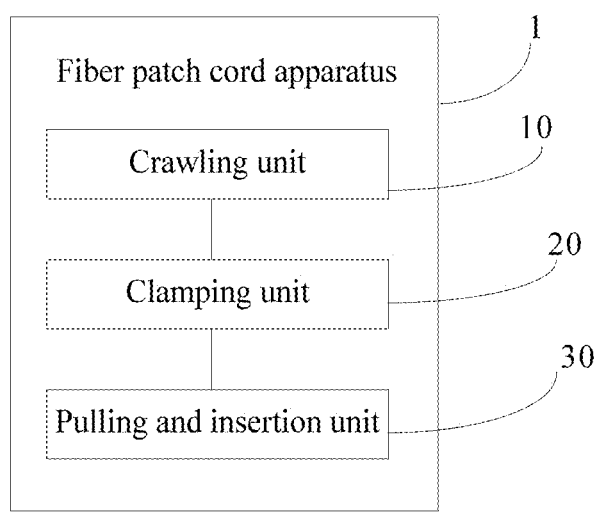
FIG. 1 is a schematic structural diagram of a fiber patch cord apparatus according to an embodiment of the present disclosure.

Furthermore, an embodiment of the present disclosure provides a fiber patch cord apparatus 1, which, as shown in FIG. 1, includes a crawling unit 10 configured to move to a corresponding position of a source adapter port along a crawling guide rail provided by a port panel, a clamping unit 20 configured to clamp a fiber patch cord on the source adapter port, and a pulling and insertion unit 30 configured to pull the fiber patch cord out of the source adapter port, where the crawling unit 10 is further configured to move to a corresponding position of a target adapter port along the crawling guide rail provided by the port panel. The pulling and insertion unit 30 is further configured to insert the fiber patch cord into the target adapter port, and the fiber patch cord apparatus is located on the port panel, the crawling guide rail is formed by connecting a sub guide rail on a first mold strip to a sub guide rail on at least one mold strip adjacent to the first mold strip in a second direction, the first mold strip is any mold strip in at least two mold strip groups arranged in an array on the port panel along a first direction, each of the mold strip groups can move along the first direction, each of the mold strip groups includes at least two mold strips arranged in an array along the second direction, an adapter port is disposed on each of the mold strips, the second direction is perpendicular to the first direction, and the first direction is a row direction or a column direction, where the row direction is a direction parallel to a placement surface when the fiber distribution terminal is normally placed, and the column direction is a direction perpendicular to the placement surface when the fiber distribution terminal is normally placed.

In this way, the fiber patch cord apparatus moves to the corresponding position of the source adapter port on the crawling guide rail provided by the port panel, then, pulls the fiber patch cord out of the source adapter port after clamping the fiber patch cord on the source adapter port, and then, moves to the corresponding position of the target adapter port on the crawling guide rail provided by the port panel, and inserts the fiber patch cord into the target adapter port in order to perform patching on the fiber patch cord on the adapter port of the port panel, which simplifies a structure of the fiber patch cord system.

Figure 2:
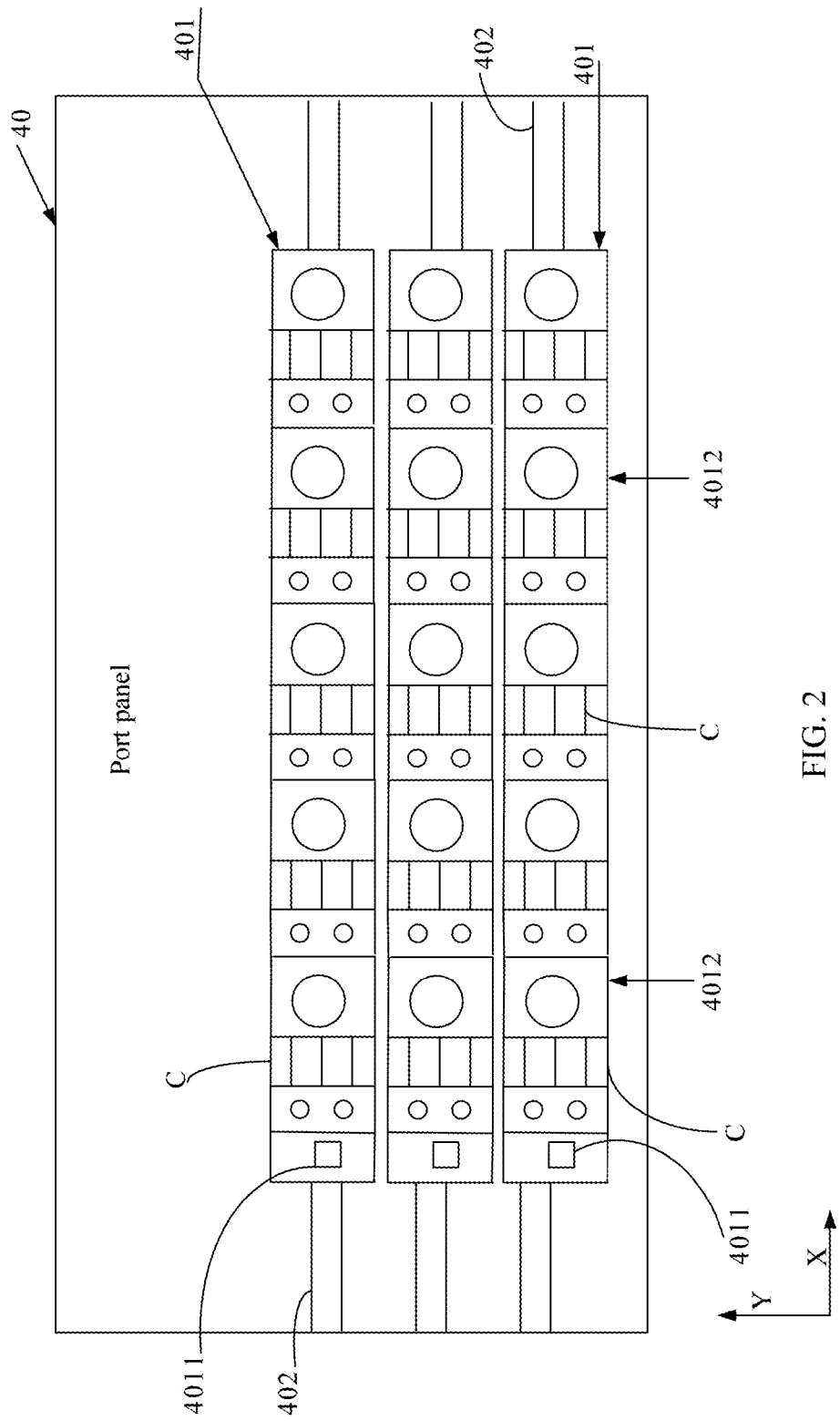
FIG. 2 is a schematic structural diagram of a port panel according to an embodiment of the present disclosure.

It should be noted that, as shown in FIG. 2, the port panel 40 includes at least two mold strip groups 401 arranged in an array along the first direction, and at least two guide posts 402. Each of the guide posts 402 is connected to the mold strip group 401, and each of the mold strip groups 401 includes a network port 4011 and at least two mold strips 4012 arranged in an array along the second direction. A sub guide rail C is disposed on each of the mold strips 4012, and a guiding direction of the sub guide rail C is parallel to the second direction. The crawling guide rail is formed by connecting the sub guide rail on the first mold strip to the sub guide rail on the at least one mold strip adjacent to the first mold strip in the second direction. The first mold strip is any mold strip in the at least two mold strip groups. The second direction is perpendicular to the first direction. Therefore, the fiber patch cord apparatus can move along the crawling guide rail. In this case, assuming that the first direction is an X direction in FIG. 2, the second direction is a Y direction in FIG. 2.

Figure 3:
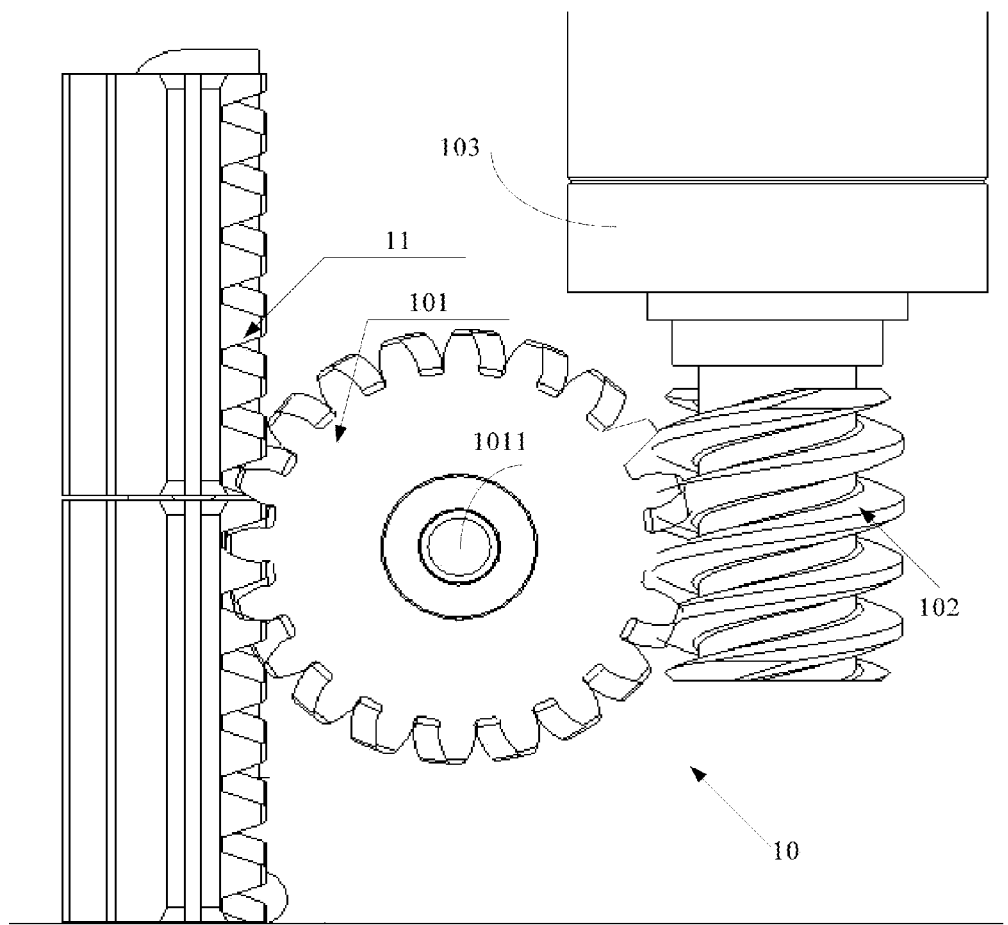
FIG. 3 is a schematic structural diagram of another fiber patch cord apparatus according to an embodiment of the present disclosure.

Furthermore, as shown in FIG. 3, the crawling unit 10 of the fiber patch cord apparatus 1 includes a crawling gear 101, a drive worm 102, a crawling motor 103, and a housing (which is not drawn in FIG. 3). The housing is configured to protect and fasten an internal unit of the fiber patch cord apparatus 1. The crawling gear 101 and the drive worm 102 are enveloped by the housing, and the crawling gear 101 is fastened to the housing at a gear center 1011 of the crawling gear, is engaged with a drive rack 11 arranged in an array on the crawling guide rail along the second direction, and is further engaged with the drive worm 102. The crawling motor 103 is connected to the drive worm 102.

When the crawling motor 103 runs to drive the drive worm 102 to rotate spirally, the crawling gear 101 of the crawling unit 10 of the fiber patch cord apparatus 1 is engaged with the drive worm 102, to drive the crawling gear 101 to rotate. At the same time, the crawling gear 101 is engaged with the drive rack 11 on the crawling guide rail disposed on the port panel, to drive the crawling gear 101 to move on the crawling guide rail along the second direction such that the fiber patch cord apparatus moves, on the crawling guide rail disposed on the port panel, along the second direction.

Figure 4:
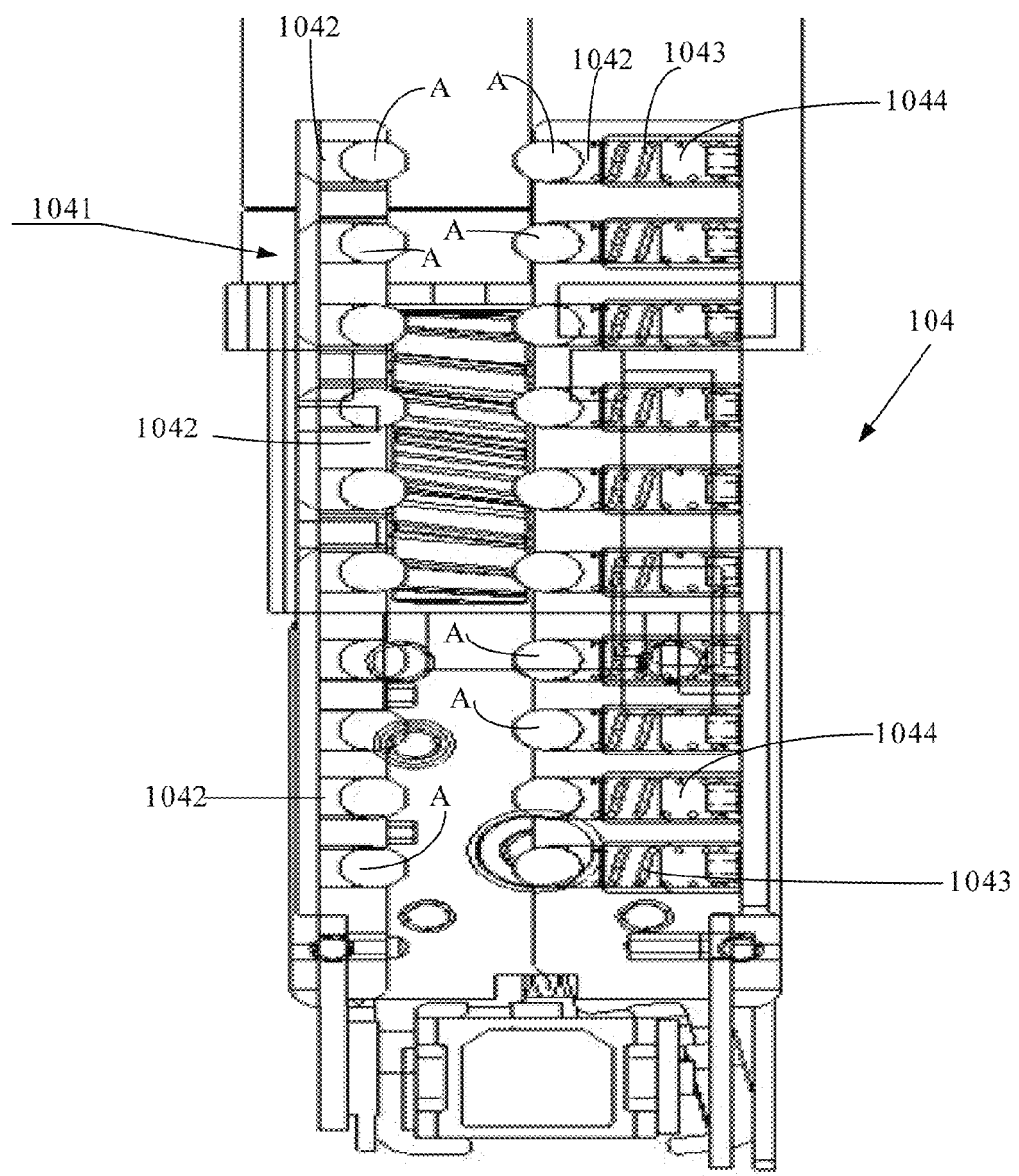
FIG. 4 is a schematic structural diagram of still another fiber patch cord apparatus according to an embodiment of the present disclosure.

The crawling unit 10 further includes a sliding structure 104. As shown in FIG. 4, the sliding structure 104 is fastened to the housing (which is not shown in FIG. 4) that envelopes the crawling gear 101 and the drive worm 102, and the sliding structure 104 includes at least two ball groups 1041, where balls A in each of the ball groups 1041 are arranged in a linear array along the second direction, and the balls A may be steel balls. A first elastic element 1043 connected to the ball is disposed corresponding to any ball in a first ball group, where the first ball group is at least one ball group in the two ball groups. As shown in FIG. 4, each of the balls A is fastened to a holder 1042, the holder 1042 is connected to the first elastic element 1043, and the first elastic element 1043 is connected to a tuning screw 1044, where the first elastic element 1043 may be a compression spring, and the tuning screw 1044 may be a fastening screw.

Figure 5:
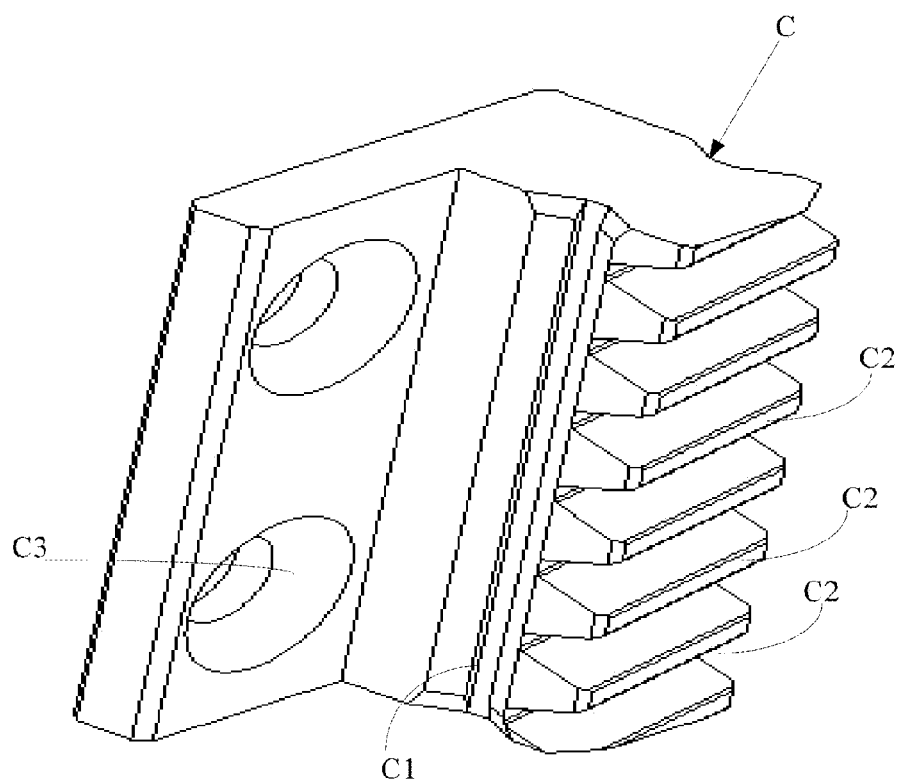
FIG. 5 is a schematic structural diagram of another port panel according to an embodiment of the present disclosure.

It should be noted that, the ball is in elastic contact with a guiding guide rail of the sub guide rail disposed on the port panel. As shown in FIG. 5, each of the sub guide rails C includes a guiding guide rail C1 and a drive rack C2. The guiding guide rail C1 is configured to guide the fiber patch cord apparatus, and the drive rack C2 is arranged in an array along the second direction, and are configured to engage with a drive gear of the fiber patch cord apparatus such that the fiber patch cord apparatus moves along a guiding direction of the guiding guide rail C1. Particularly, each of the sub guide rails C is provided with fastening holes C3, and can be fastened to the mold strip 4012 by means of the fastening holes C3 using a screw. That is, the sliding structure is in elastic contact with the guiding guide rail on the crawling guide rail formed by connecting the sub guide rails C, and the guiding direction of the guiding guide rail is parallel to the second direction. Particularly, pressing force of two rows of the balls may be manually adjusted. For example, when the tuning screw 1044 is adjusted to a direction close to the balls A, compression thrust of the first elastic element 1043 can be increased, and then a distance between two opposite balls decreases as the compression thrust of the first elastic element 1043 increases such that friction of the balls A on the guiding guide rail is increased. When the tuning screw 1044 is adjusted to a direction away from the balls A, compression thrust of the first elastic element 1043 can be decreased, and then a distance between two opposite balls increases as the compression thrust of the first elastic element 1043 decreases such that friction of the balls A on the guiding guide rail is decreased. In this way, a ball slides, in a manner of being in elastic contact with the guiding guide rail, on the guiding guide rail, that is, the fiber patch cord apparatus slides, in a ball rolling manner, on the guiding guide rail, and the first elastic element 1043 can be adjusted to increase or decrease the compression thrust of the first elastic element 1043, that is, to increase or decrease the friction on the guiding guide rail of the ball in order to adapt to a processing error and a splicing error of the guiding guide rail.

Figure 6:
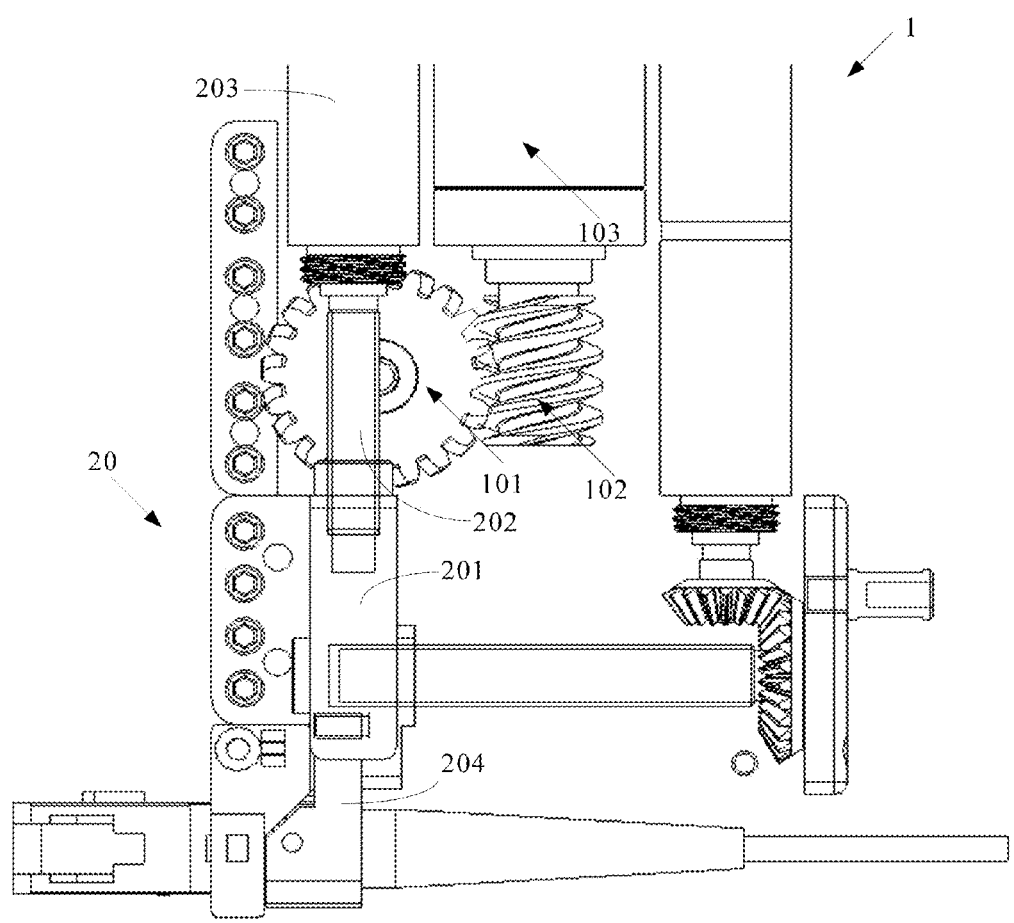
FIG. 6 is a schematic structural diagram of yet another fiber patch cord apparatus according to an embodiment of the present disclosure.
Figure 7:
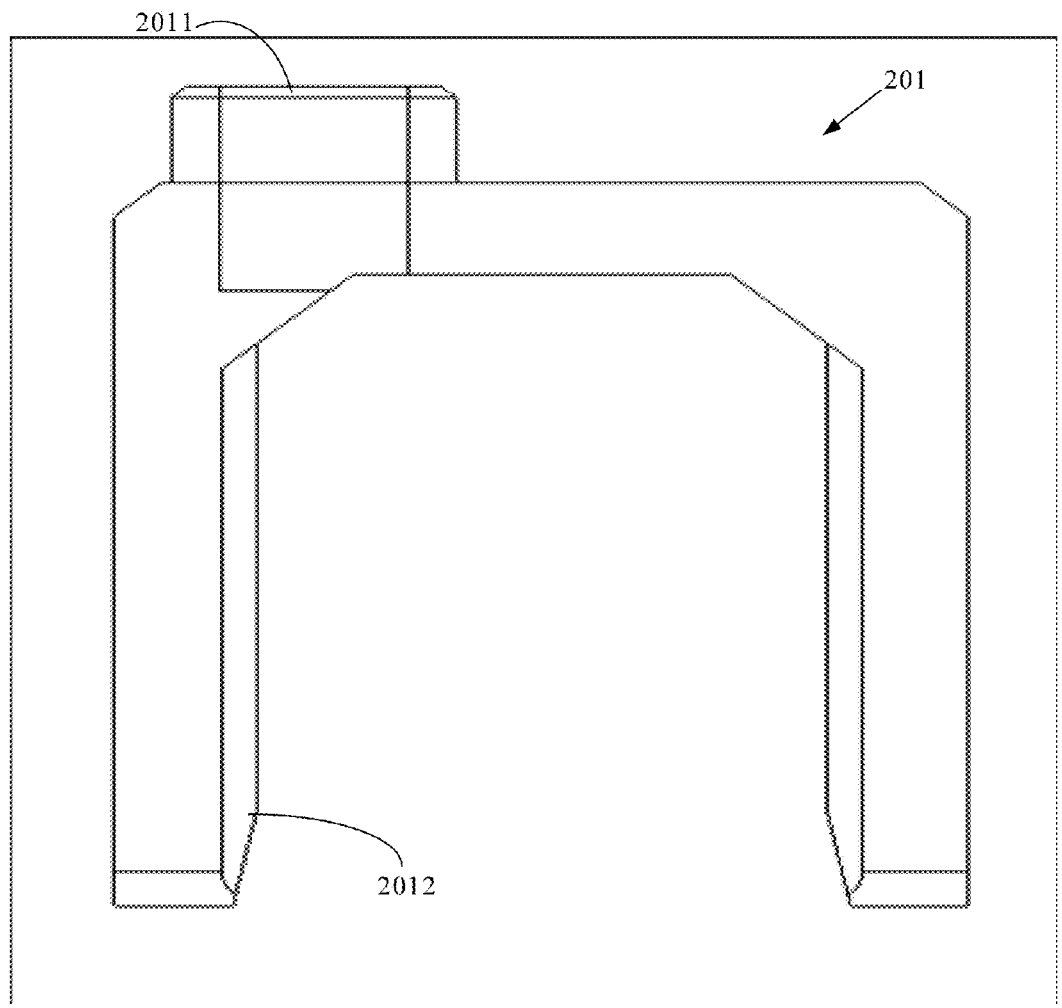
FIG. 7 is a schematic structural diagram of still yet another fiber patch cord apparatus according to an embodiment of the present disclosure.
Figure 8:
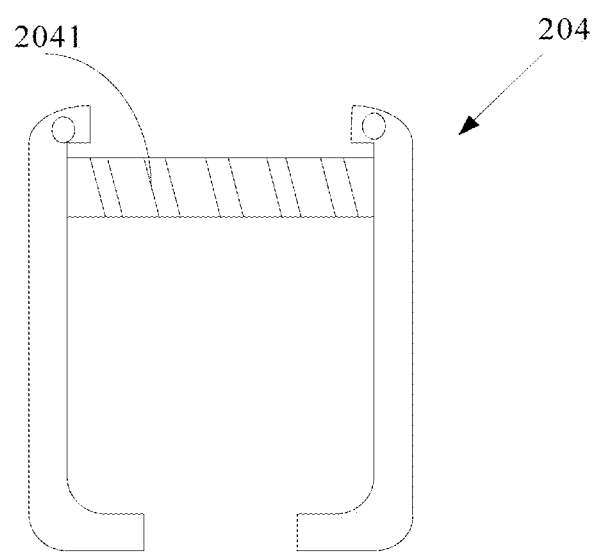
FIG. 8 is a schematic structural diagram of a further fiber patch cord apparatus according to an embodiment of the present disclosure.

In addition, as shown in FIG. 6, the clamping unit 20 of the fiber patch cord apparatus 1 includes a clamping element 201, a bolt 202, a clamping motor 203, and a clamping jaw 204. Exemplarily, as shown in FIG. 7, the clamping element 201 may be a U-shaped clamping element, and the U-shaped clamping element is provided with a screw hole 2011 and a first opening 2012 that has a chamfer. It is assumed that the clamping element 201 in this embodiment of the present disclosure is the U-shaped clamping element 201, and then, as shown in FIG. 6, the bolt 202 may be connected to the U-shaped clamping element 201 using the screw hole 2011, and the bolt 202 is connected to the clamping motor 203. Exemplarily, as shown in FIG. 8, a second elastic element 2041 is disposed on the clamping jaw 204, and the second elastic element 2041 provides an elastic force parallel to the first direction for the clamping jaw 204. The U-shaped clamping element 201 is sleeved on the clamping jaw 204 by means of the first opening 2012, and the second elastic element 2041 may be a compression spring.

It should be noted that, the clamping motor runs to drive the bolt to move along the second direction, and the bolt is connected to the U-shaped clamping element. In this case, the U-shaped clamping element is driven to also move along the second direction, and the U-shaped clamping element enables the clamping jaw to perform clamping or spread.

Exemplarily, the following describes, using FIG. 9 to FIG. 13, processes in which the U-shaped clamping element clamps the clamping jaw and spreads the clamping jaw.

Figure 9:
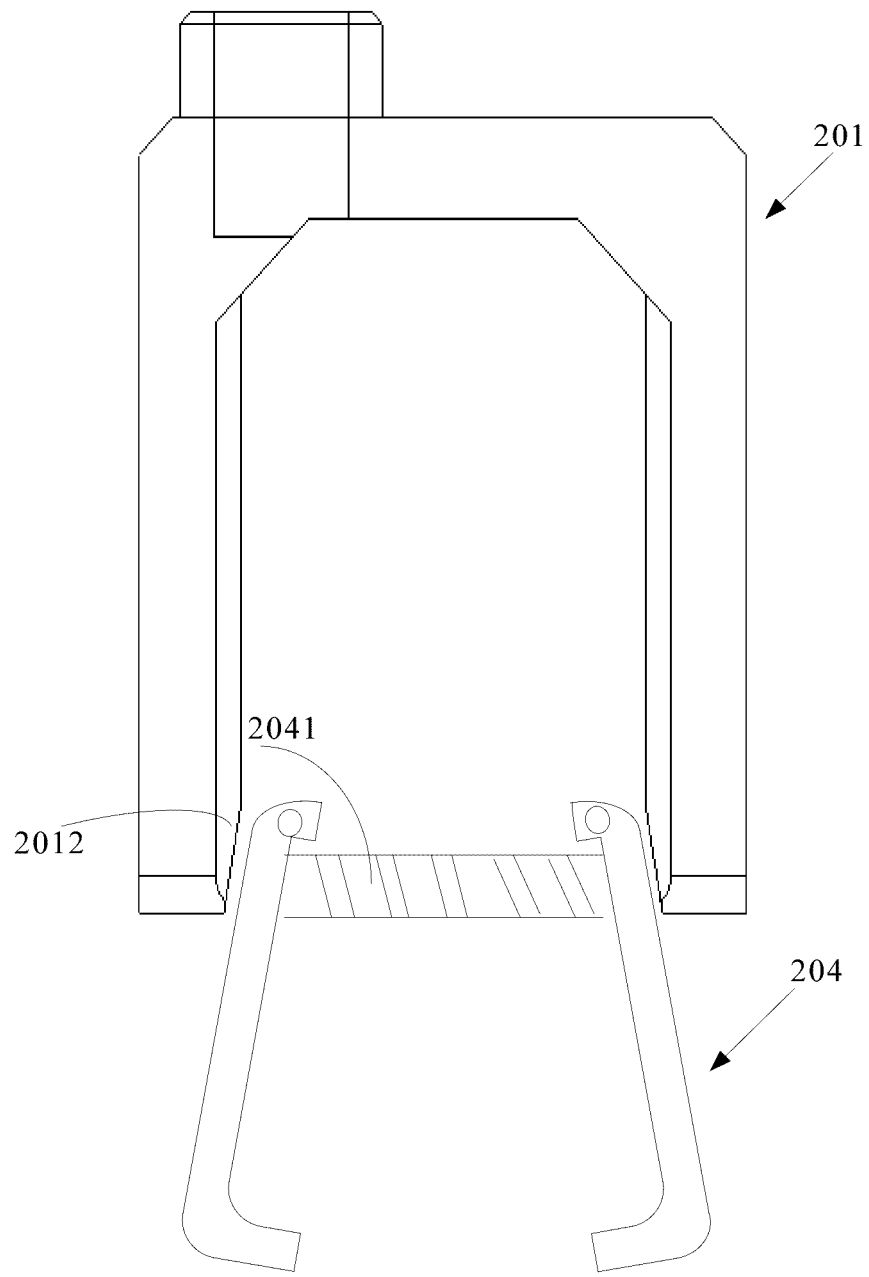
FIG. 9 is schematic diagram 1 of a process in which a U-shaped clamping element clamps a clamping jaw according to an embodiment of the present disclosure.
Figure 10:
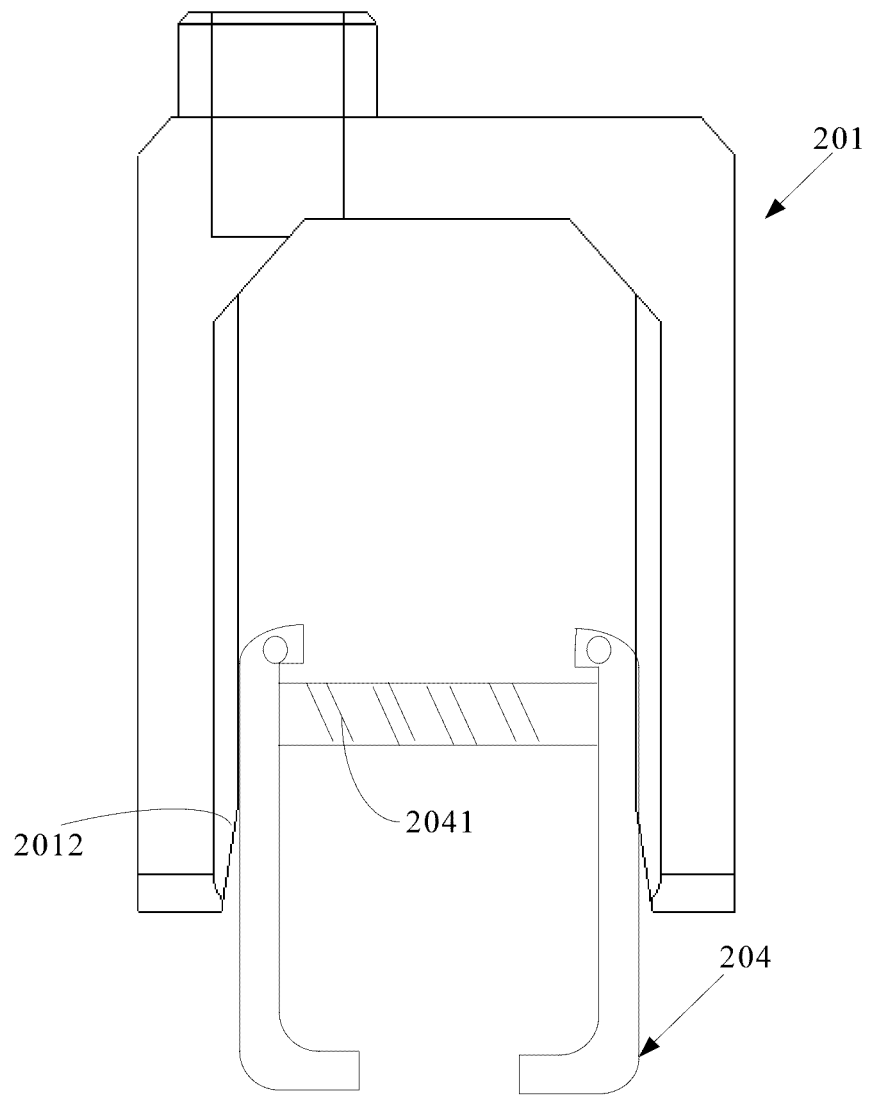
FIG. 10 is schematic diagram 2 of a process in which a U-shaped clamping element clamps a clamping jaw according to an embodiment of the present disclosure.
Figure 11:
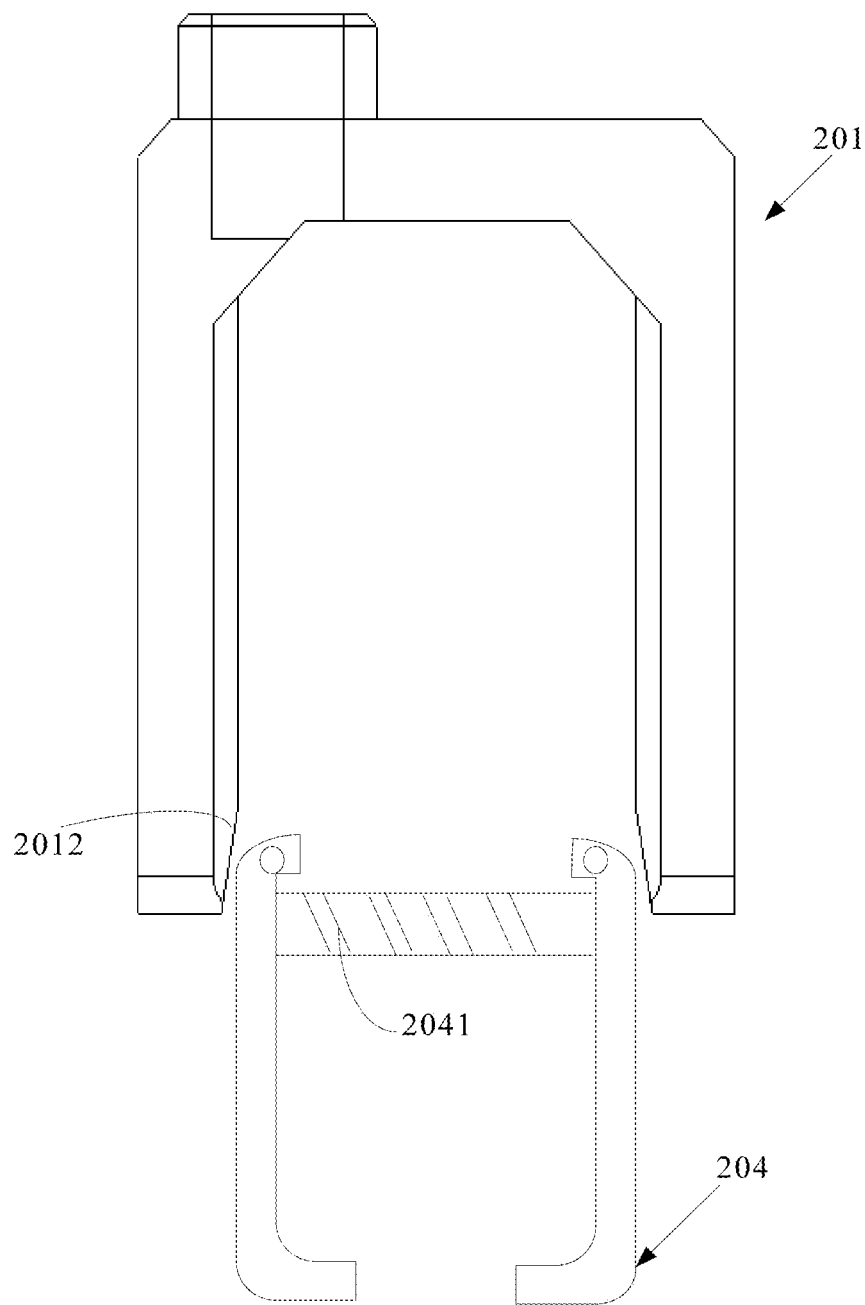
FIG. 11 is schematic diagram 3 of a process in which a U-shaped clamping element clamps a clamping jaw according to an embodiment of the present disclosure.

As shown in FIG. 9 to FIG. 11, when a contact area between the first opening 2012 of the U-shaped clamping element 201 and the clamping jaw 204 gradually increases, the first opening 2012 contracts under the effect of the second elastic element 2041 and the clamping jaw 204 performs clamping, and then when the clamping motor 203 runs to drive the bolt 202 to drive the U-shaped clamping element 201 to also move along the second direction, the contact area between the first opening 2012 and the clamping jaw 204 gradually decreases.

Figure 12:
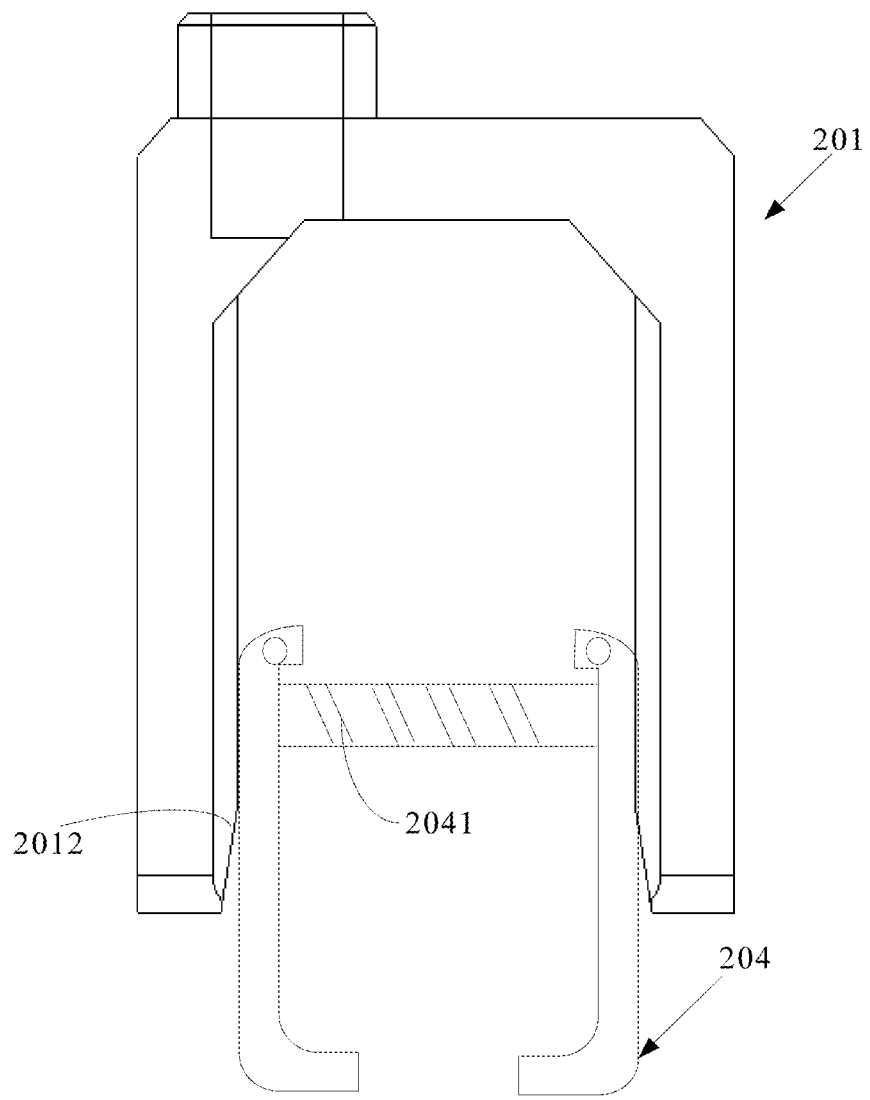
FIG. 12 is schematic diagram 1 of a process in which a U-shaped clamping element spreads a clamping jaw according to an embodiment of the present disclosure.
Figure 13:
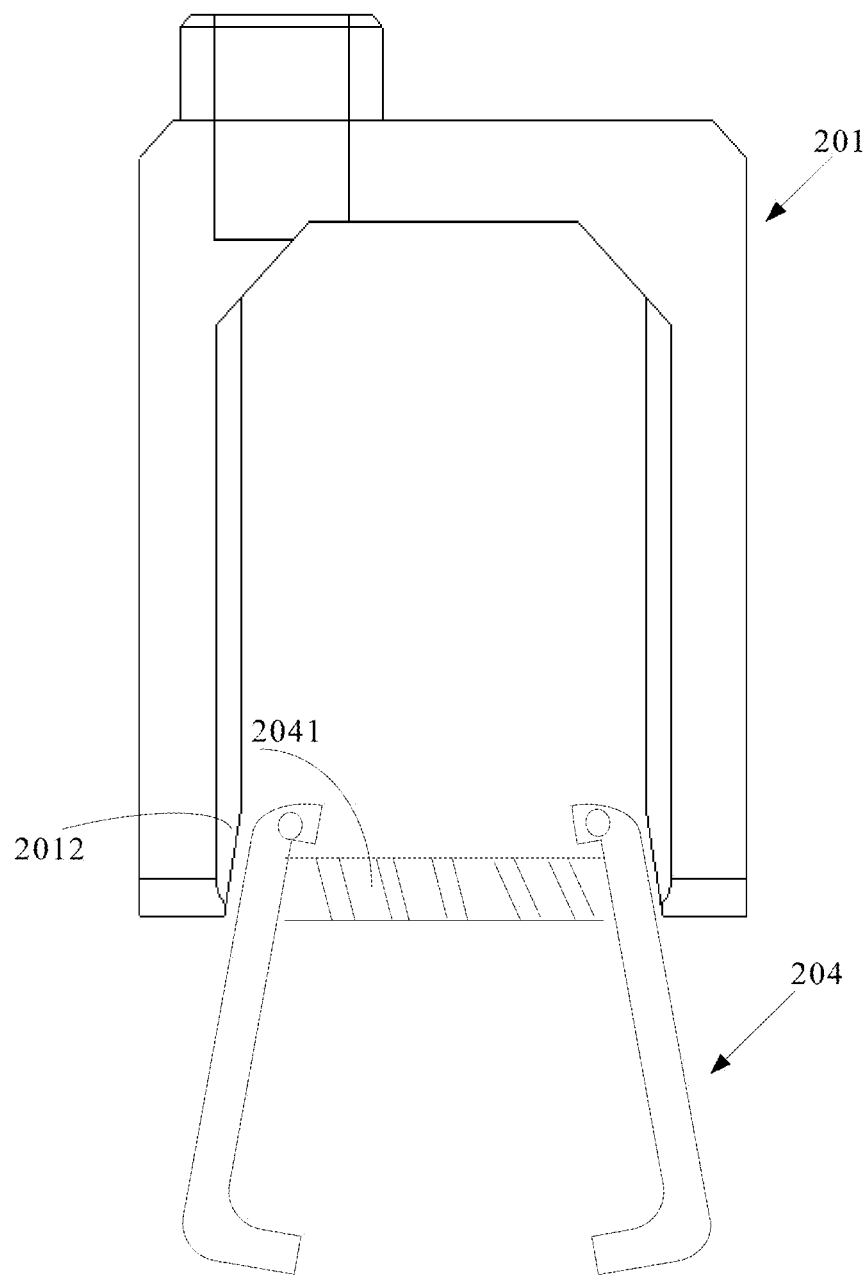
FIG. 13 is schematic diagram 2 of a process in which a U-shaped clamping element spreads a clamping jaw according to an embodiment of the present disclosure.

As shown in FIG. 12 and FIG. 13, when the U-shaped clamping element 201 moves again along a direction parallel to the second direction, the contact area between the first opening 2012 and the clamping jaw 204 gradually increases again, and then when the clamping motor 203 runs to drive the bolt 202 to drive the U-shaped clamping element 201 to also move along the second direction, the contact area between the first opening 2012 and the clamping jaw 204 gradually decreases, and in this case, the first opening 2012 stretches under the effect of the second elastic element, and the clamping jaw 204 spreads.

Figure 14:
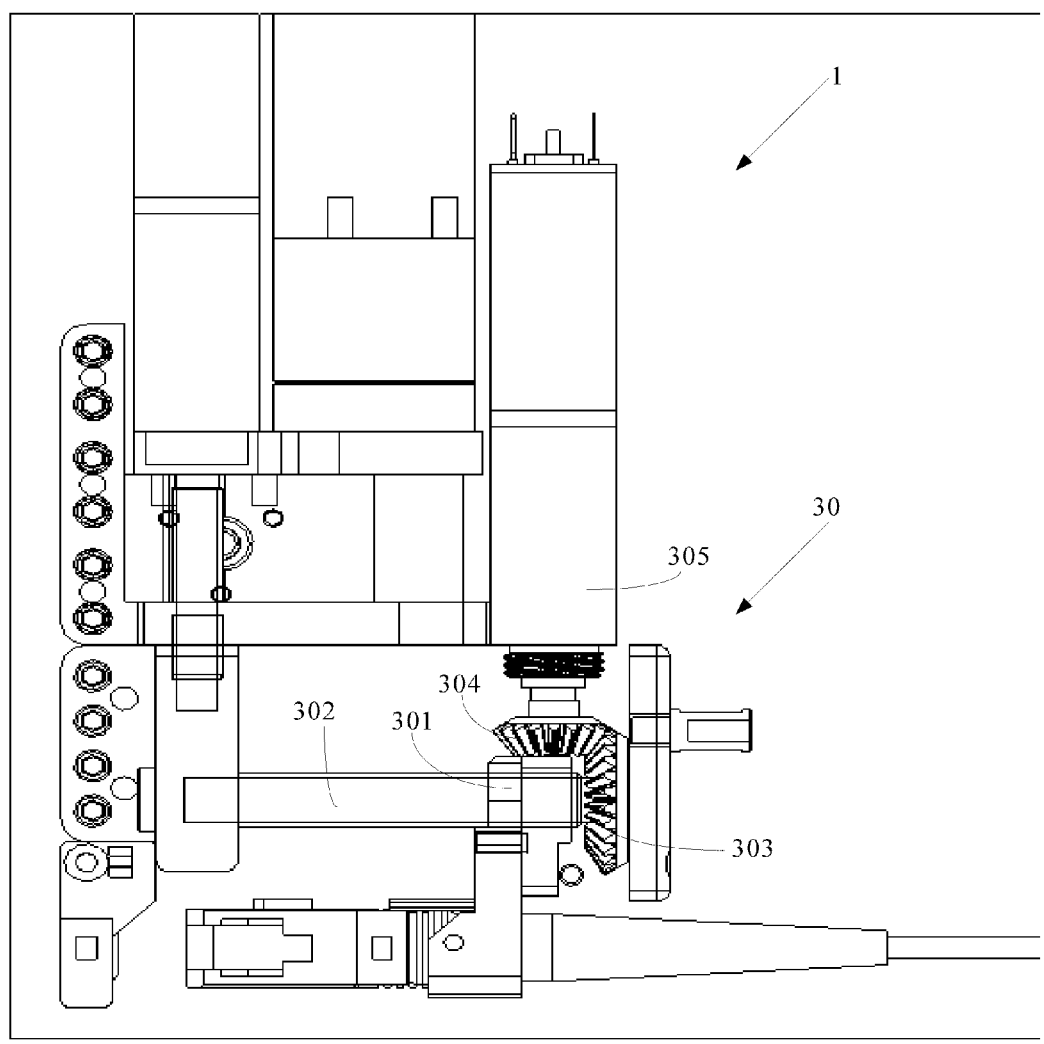
FIG. 14 is a schematic structural diagram of a still further fiber patch cord apparatus according to an embodiment of the present disclosure.

As shown in FIG. 14, the pulling and insertion unit 30 of the fiber patch cord apparatus 1 includes a sliding element 301, a rotating shaft 302, a first bevel gear 303, a second bevel gear 304, and a pulling and insertion motor 305. The sliding element 301 is connected to the clamping jaw 204, the sliding element 301 is connected to the rotating shaft 302, the rotating shaft 302 is connected to the first bevel gear 303, the first bevel gear 303 is engaged with the second bevel gear 304, and the second bevel gear 304 is connected to the pulling and insertion motor 305.

It should be noted that, when the pulling and insertion motor runs to drive the second bevel gear to rotate, and the second bevel gear is engaged with the first bevel gear, in this case, the first bevel gear is driven to drive the rotating shaft to rotate such that the sliding element slides on the rotating shaft, thereby driving the clamping jaw connected to the sliding element to pull or insert, along a third direction, the fiber patch cord, where the third direction is a direction perpendicular to a plane constituted by the first direction and the second direction.

Figure 15:
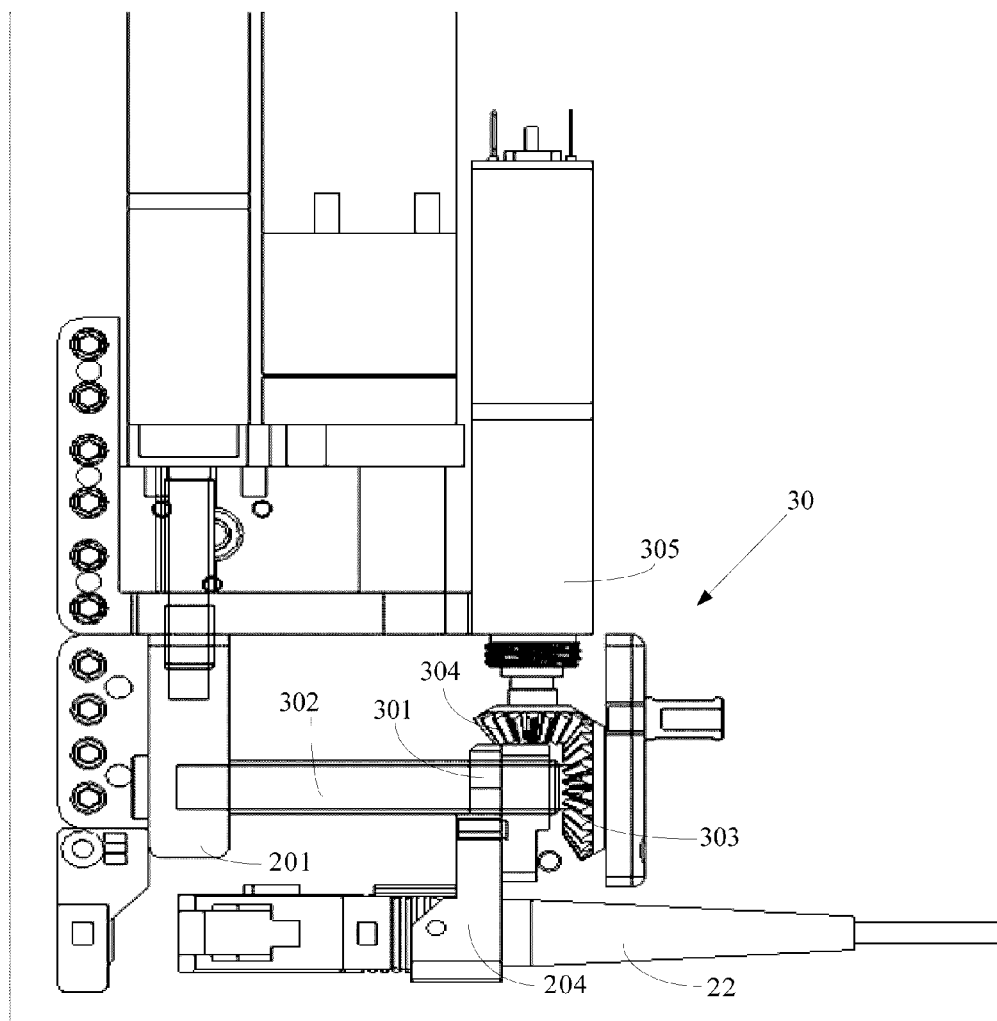
FIG. 15 is schematic diagram 1 of a process in which a pulling and insertion unit pulls and inserts a fiber patch cord according to an embodiment of the present disclosure.
Figure 16:
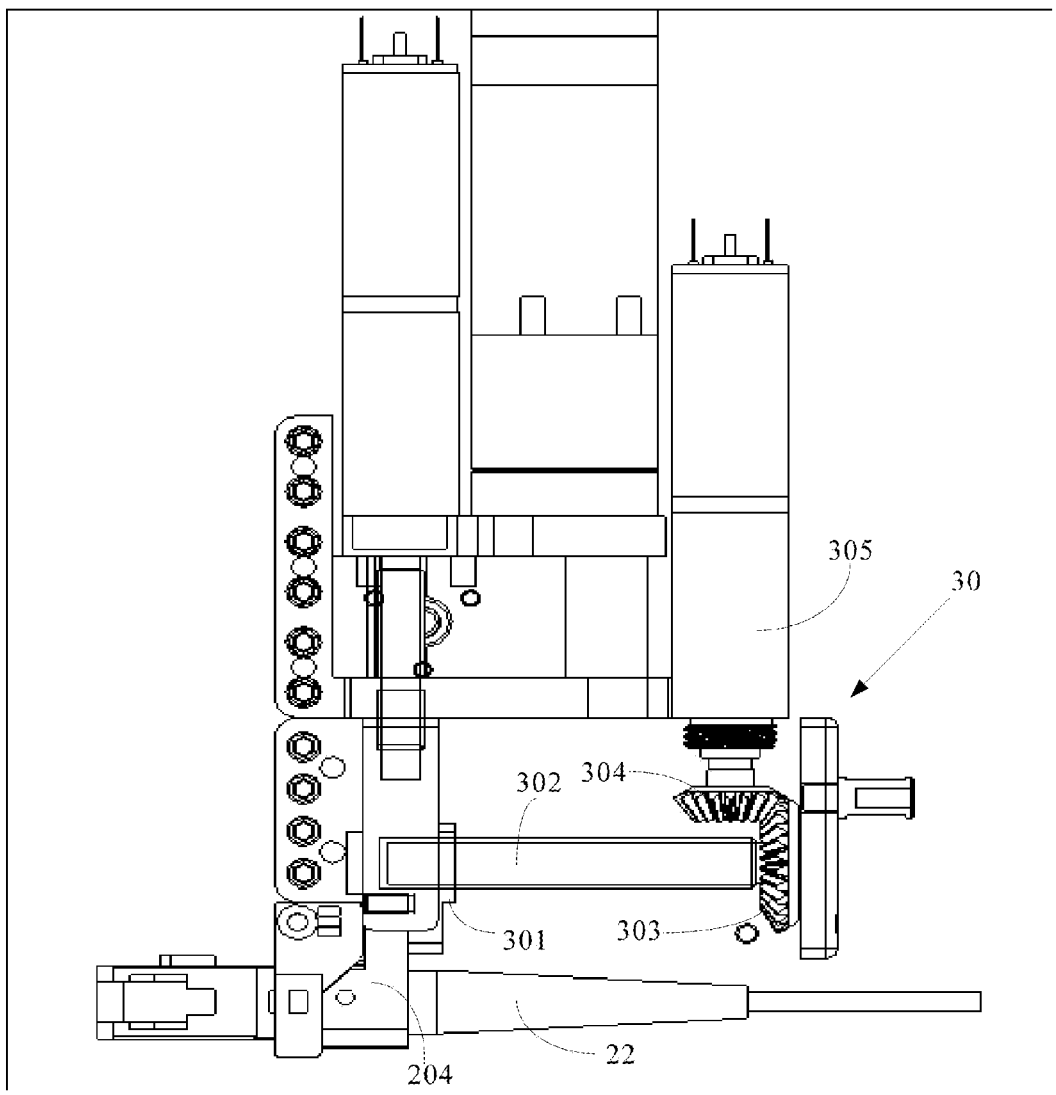
FIG. 16 is schematic diagram 2 of a process in which a pulling and insertion unit pulls and inserts a fiber patch cord according to an embodiment of the present disclosure.

Exemplarily, the following describes, using FIG. 15 and FIG. 16, a process in which the pulling and insertion unit pulls and inserts a fiber patch cord.

As shown in FIG. 15, after the U-shaped clamping element 201 drives the clamping jaw 204 to clamp the fiber patch cord 22, the pulling and insertion motor 305 of the pulling and insertion unit 30 runs to drive the second bevel gear 304 to rotate, and the second bevel gear 304 is engaged with the first bevel gear 303. In this case, the first bevel gear 303 is driven to drive the rotating shaft 302 to rotate such that the sliding element 301 slides on the rotating shaft 302, thereby driving the clamping jaw 204 connected to the sliding element 301 to pull, along the third direction, the fiber patch cord 22 out of the source adapter port. Then, as shown in FIG. 16, the fiber patch cord apparatus moves to the target adapter port into which the fiber patch cord needs to be inserted, the pulling and insertion motor 305 of the pulling and insertion unit 30 runs to drive the second bevel gear 304 to rotate, and the second bevel gear 304 is engaged with the first bevel gear 303, in this case, the first bevel gear 303 is driven to drive the rotating shaft 302 to rotate such that the sliding element 301 slides on the rotating shaft 302, thereby drive thing clamping jaw 204 connected to the sliding element 301 to insert, along the third direction, the fiber patch cord 22 into the target adapter port.

It should be noted that, a radio frequency identification (RFID) read head is further disposed on the fiber patch cord apparatus, and is configured to read information about a RFID label on a fiber patch cord such that the fiber patch cord apparatus identifies a fiber patch cord that needs to be pulled and inserted in order to correctly perform the pulling and insertion and establish information about pairing between the fiber patch cord and an adapter port. Particularly, information about a RFID label on a fiber patch cord inserted into the adapter port is stored in the RFID read head. The RFID is a wireless communications technology, and can identify a specific target using a radio signal and read/write-related data, without a need of establishing mechanical or optical contact between an identification system and the specific target.

Figure 17:
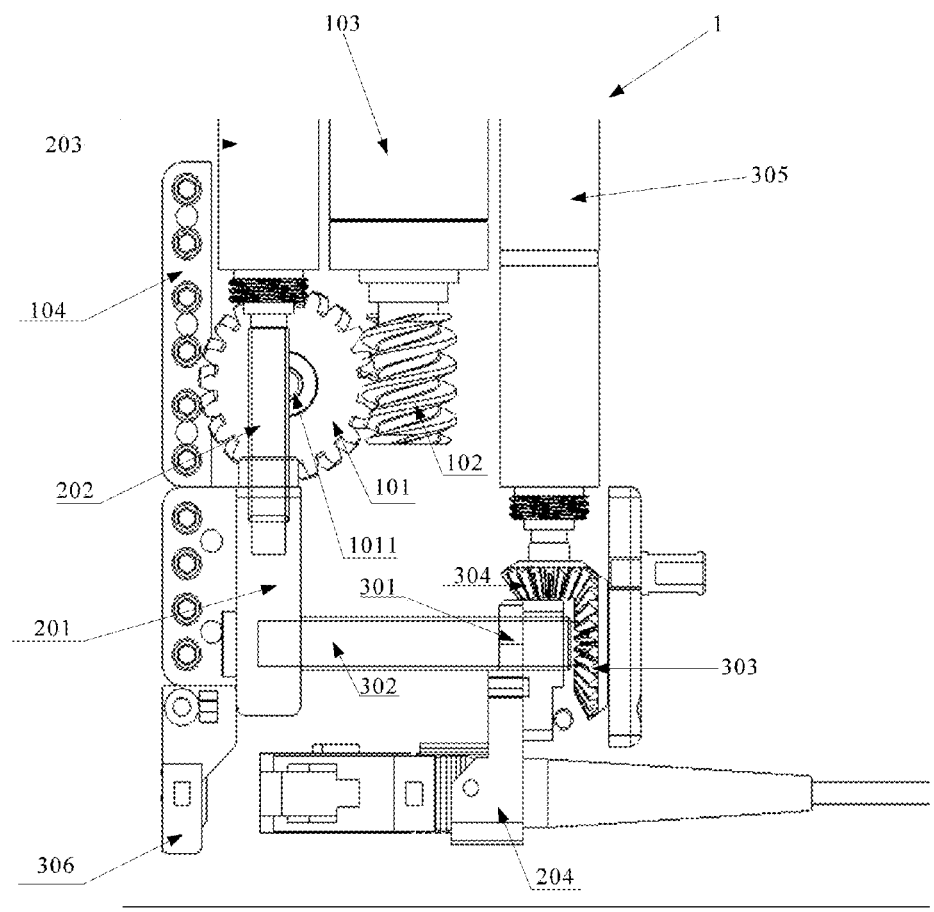
FIG. 17 is a schematic structural diagram of a yet further fiber patch cord apparatus according to an embodiment of the present disclosure.

Exemplarily, as shown in FIG. 17, an overall structure of the fiber patch cord apparatus 1 includes the crawling gear 101, the drive worm 102, the crawling motor 103, the sliding structure 104, the clamping element 201, the bolt 202, the clamping motor 203, the clamping jaw 204, the sliding element 301, the rotating shaft 302, the first bevel gear 303, the second bevel gear 304, the pulling and insertion motor 305, and the RFID read head 306, where the RFID read head 306 may be fastened to the sliding structure 104. For a specific connection relationship between units of the fiber patch cord apparatus 1, reference may be made to the descriptions about FIG. 3, FIG. 4, FIG. 6, and FIG. 14.

An embodiment of the present disclosure provides a port panel 40, which, as shown in FIG. 2, includes at least two mold strip groups 401 arranged in an array along a first direction, and at least two guide posts 402, where each of the guide posts 402 is connected to the mold strip group 401, to enable the mold strip group 401 to move along the first direction using the guide post 402, where each of the mold strip groups 401 includes at least two mold strips arranged in an array along a second direction, where the second direction is perpendicular to the first direction, and an adapter port is disposed on each of the mold strips, a sub guide rail is disposed at a first position of each of the mold strips, and a guiding direction of the sub guide rail is parallel to the second direction, where a crawling guide rail is formed by connecting a sub guide rail on a first mold strip to a sub guide rail on at least one mold strip adjacent to the first mold strip in the second direction, such that a fiber patch cord apparatus can move along the crawling guide rail, and the first mold strip is any mold strip in the at least two mold strip groups, the second direction is perpendicular to the first direction, and the first direction is a row direction or a column direction, where the row direction is a direction parallel to a placement surface when the fiber distribution terminal is normally placed, and the column direction is a direction perpendicular to the placement surface when the fiber distribution terminal is normally placed.

In this way, at least two mold strip groups and at least two guide posts are disposed on a port panel, each of the guide posts is connected to the mold strip group, a sub guide rail is disposed on the mold strip group, and the mold strip group can move on the guide post in order to drive a fiber patch cord apparatus on the sub guide rail of the mold strip group to move, which implements patching of a fiber patch cord, thereby simplifying a structure of a fiber patch cord system is simplified.

Figure 18:
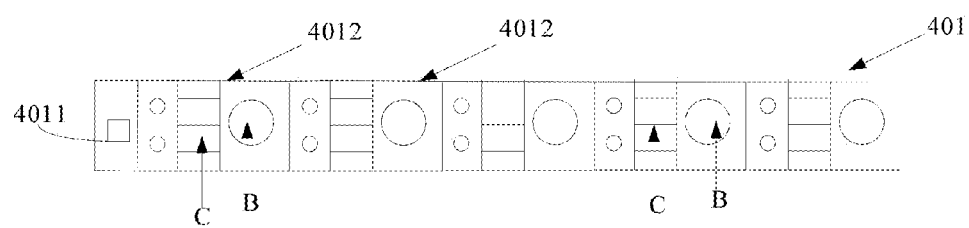
FIG. 18 is a schematic structural diagram of still another port panel according to an embodiment of the present disclosure.

As shown in FIG. 18, a network port 4011 is disposed on each of the mold strip groups 401, and each of the mold strip groups 401 includes at least two mold strips 4012. The mold strips 4012 are arranged in an array along the first direction, and an adapter port B is disposed on each of the mold strips 4012, where the adapter port B may be an optical port that is configured to connect to an optical fiber, and is a passive connector, and a sub guide rail C is disposed at a first position of each of the mold strips 4012, where the first position may be a position parallel to the adapter port B along the first direction, and a guiding direction of the sub guide rail C is parallel to the second direction.

Figure 19:
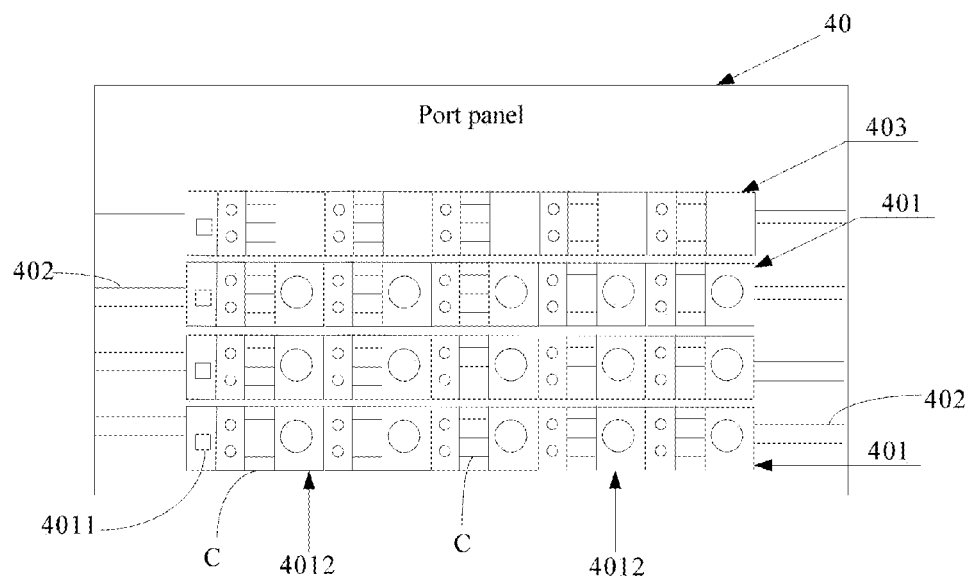
FIG. 19 is a schematic structural diagram of yet another port panel according to an embodiment of the present disclosure.

Particularly, the port panel further includes a special mold strip group, where the special mold strip group includes only a sub guide rail and a network port, does not include an adapter port, and is configured to form a crawling guide rail by being connected to a sub guide rail of a mold strip group adjacent to the sub guide rail of the special mold strip group in order to pull a fiber patch cord out of an adapter port of the adjacent mold strip group or insert a fiber patch cord into an adapter port of the adjacent mold strip group. Exemplarily, as shown in FIG. 19, a mold strip group 403 is adjacent to a mold strip group 401, and after the mold strip group 403 moves along the first direction, a sub guide rail of the special mold strip group 403 and a sub guide rail of the adjacent mold strip group 401 form a crawling guide rail, to pull a fiber patch cord out of an adapter port of the adjacent mold strip group 401 or insert a fiber patch cord into an adapter port of the adjacent mold strip group 401.

It should be noted that, each of the mold strip groups may be controlled by a controller to move along the first direction, and a distance by which each of the mold strip groups moves is less than a length of each of the mold strip groups that moves along the first direction. In an actual application, the distance by which each of the mold strip groups moves may be 3 centimeters, which is only exemplarily described and is not limited in this embodiment of the present disclosure. In this way, compared with the prior art, in this embodiment, because a distance by which a mold strip group moves is relatively short, space utilization of a fiber distribution terminal is effectively improved.

Furthermore, as shown in FIG. 5, each of the sub guide rails C includes a guiding guide rail C1 and a drive rack C2. The guiding guide rail C1 is configured to guide the fiber patch cord apparatus, and the drive rack C2 is arranged in an array along the second direction, and are configured to engage with a drive gear of the fiber patch cord apparatus, such that the fiber patch cord apparatus moves along a guiding direction of the guiding guide rail C1. Particularly, each of the sub guide rails C is provided with fastening holes C3, and can be fastened to the mold strip 4012 by means of the fastening holes C3 using a screw.

It should be noted that, the crawling guide rail is formed by connecting the sub guide rail on the first mold strip to the sub guide rail on the at least one mold strip adjacent to the first mold strip in the second direction such that the fiber patch cord apparatus can move along the crawling guide rail, where the first mold strip is any mold strip in the at least two mold strip groups.

Figure 20:
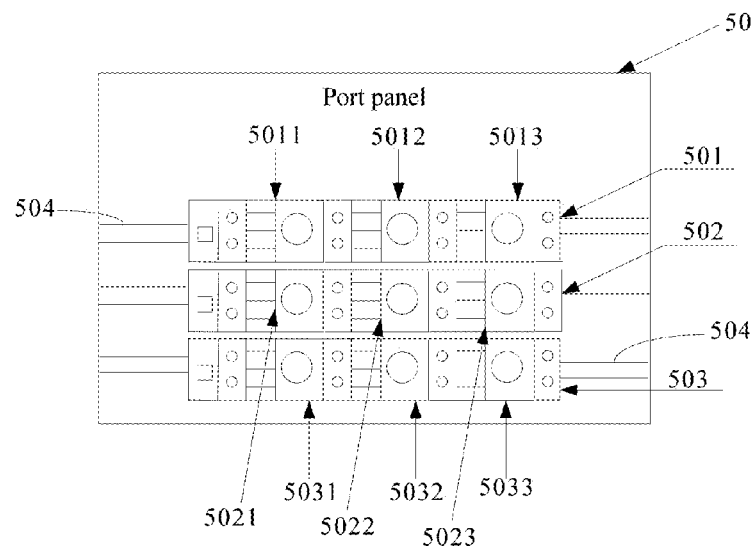
FIG. 20 is schematic diagram 1 of a process in which a mold strip group on a port panel moves according to an embodiment of the present disclosure.
Figure 21:
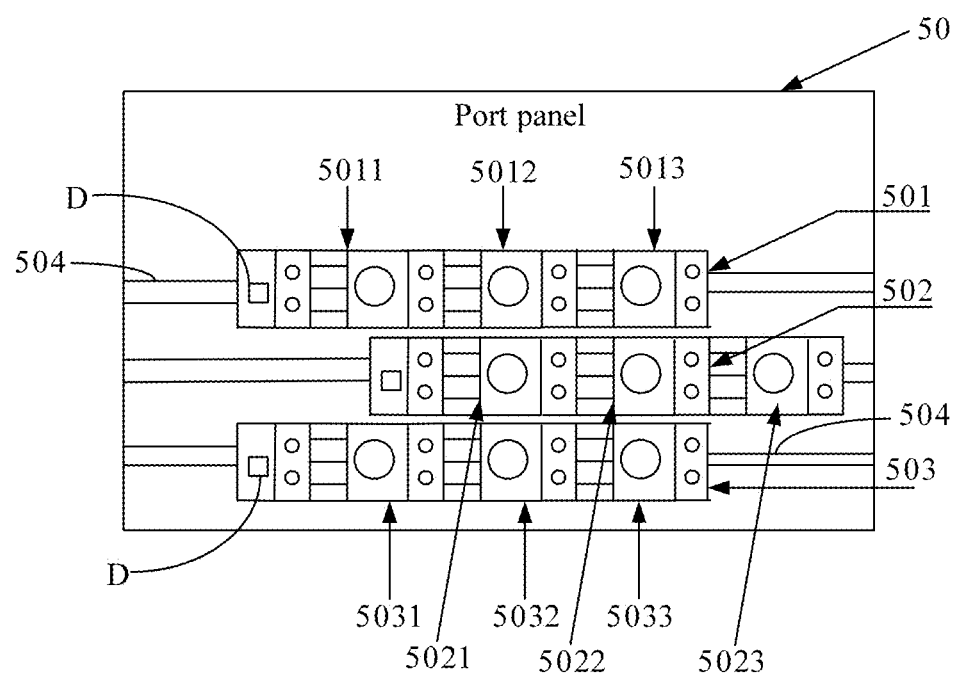
FIG. 21 is schematic diagram 2 of a process in which a mold strip group on a port panel moves according to an embodiment of the present disclosure.

Exemplarily, the foregoing describes, using FIG. 20 and FIG. 21, a process in which a mold strip group on a port panel moves.

As shown in FIG. 20, it is assumed that a port panel 50 includes a first mold strip group 501, a second mold strip group 502, a third mold strip group 503, and guide posts 504, where the first mold strip group 501 includes a mold strip 5011, a mold strip 5012, and a mold strip 5013, the second mold strip group 502 includes a mold strip 5021, a mold strip 5022, and a mold strip 5023, and the third mold strip group 503 includes a mold strip 5031, a mold strip 5032, and a mold strip 5033.

As shown in FIG. 21, after the second mold strip group 502 receives control information of a controller using a network port D, the second mold strip group 502 moves on the guide post 504 along the first direction. In this case, a sub guide rail of the mold strip 5022 of the second mold strip group 502 is aligned with a sub guide rail of the mold strip 5013 of the first mold strip group 501 and a sub guide rail of the mold strip 5033 of the third mold strip group 503, to form a crawling guide rail.

Figure 22:
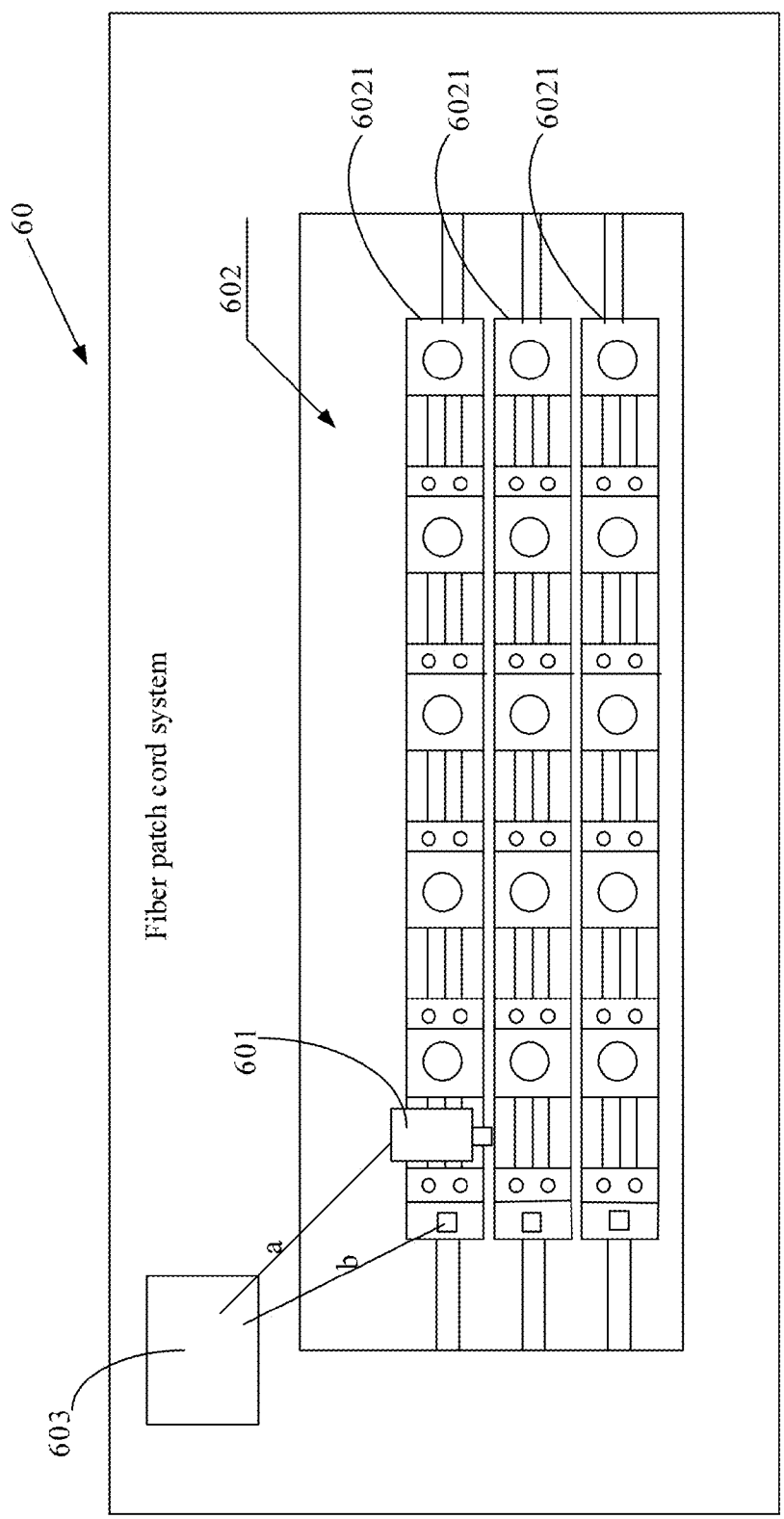
FIG. 22 is a schematic diagram of a fiber patch cord system according to an embodiment of the present disclosure.

An embodiment of the present disclosure provides a fiber patch cord system 60, which, as shown in FIG. 22, includes a fiber patch cord apparatus 601, a port panel 602, a controller 603, and a fiber distribution terminal (which is not drawn in FIG. 22).

The fiber patch cord apparatus 601 is configured to move to a corresponding position of a source adapter port along a crawling guide rail provided by the port panel 602, clamp a fiber patch cord on the source adapter port, and pull the fiber patch cord out of the source adapter port, or insert the fiber patch cord into the target adapter port, where the fiber patch cord apparatus is located on the port panel 602.

The port panel 602 is configured to provide the crawling guide rail for the fiber patch cord apparatus 601.

The controller 603 is configured to control the fiber patch cord apparatus 601 to move on the crawling guide rail.

The controller 603 is further configured to control a mold strip group 6021 of the port panel 602 to move.

The fiber distribution terminal is configured to protect the fiber patch cord apparatus 601, the port panel 602, and the controller 603, and the fiber patch cord apparatus 601, the port panel 602, and the controller 603 are located inside the fiber distribution terminal.

It may be clearly understood by a person skilled in the art that, for the purpose of convenient and brief description, for a detailed working process of the system described above, reference may be made to a corresponding process in the foregoing apparatus embodiments, and details are not provided herein again.

It should be noted that, the controller may be connected to a crawling motor of the fiber patch cord apparatus 601 using a wire such that the fiber patch cord apparatus 601 moves on the crawling guide rail according to crawling path information sent by the controller 603. The controller 603 sends control information to each of the mold strip groups according to an address of a network port of each of the mold strip groups using a network cable and the network port of each of the mold strip groups, such that each of the mold strip groups moves on a guide post according to the control information. Exemplarily, as shown in FIG. 22, each of the mold strip groups 6021 in the port panel 602 may be connected to the controller 603 using a network cable b, and the fiber patch cord apparatus 601 may be connected to the controller 603 using a wire a.

Exemplarily, the foregoing describes, using FIG. 23 to FIG. 26, a fiber patch cord process of the fiber patch cord system 60.

Figure 23:
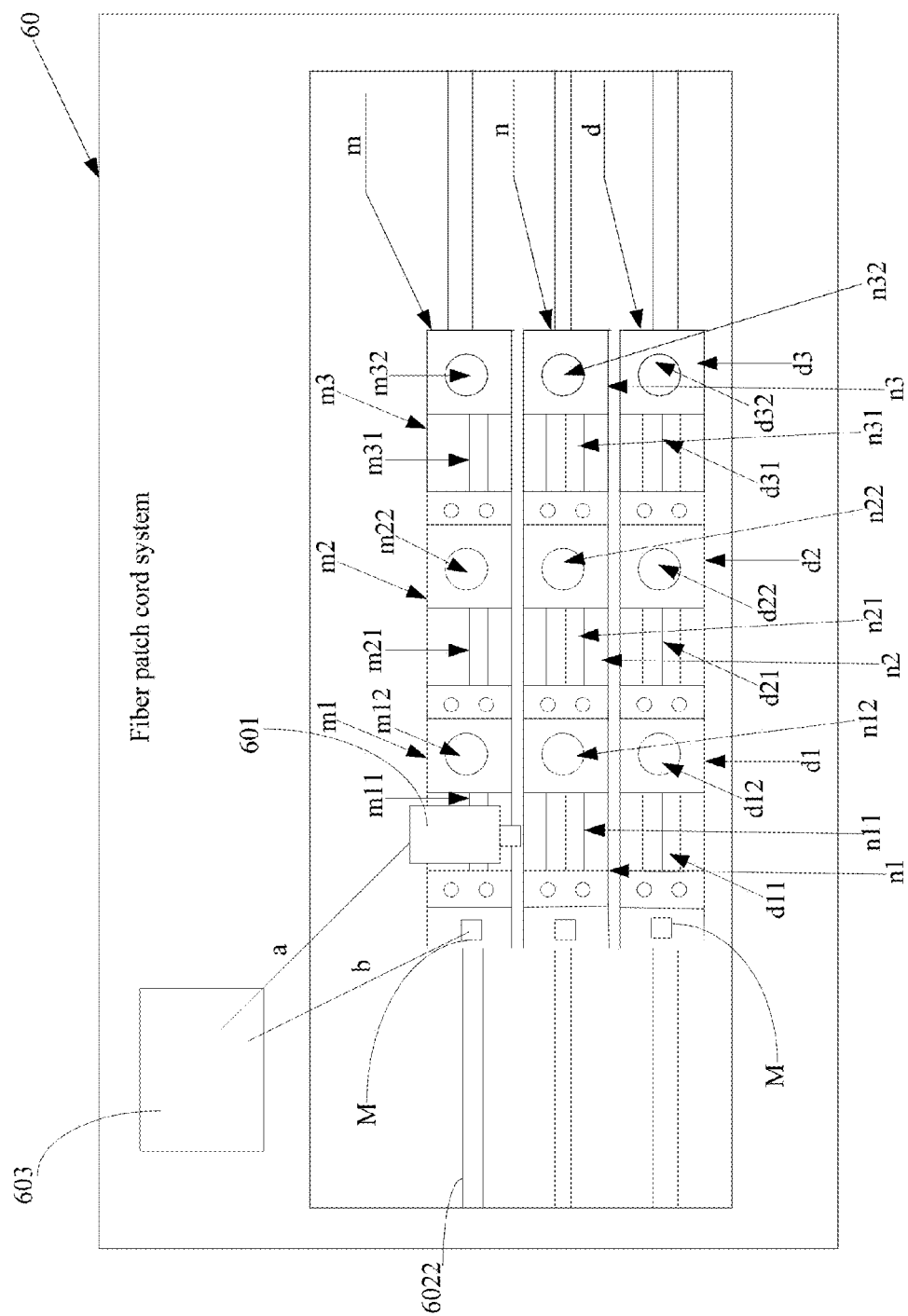
FIG. 23 is schematic diagram 1 of a fiber patch cord process of a fiber patch cord system according to an embodiment of the present disclosure.

As shown in FIG. 23, it is assumed that the mold strip groups 6021 in the fiber patch cord system 60 include a first mold strip group m, a second mold strip group n, and a third mold strip group d. The first mold strip group m includes a mold strip m1, a mold strip m2, and a mold strip m3, where the mold strip m1 includes a sub guide rail m11 and an adapter port m12, the mold strip m2 includes a sub guide rail m21 and an adapter port m22, and the mold strip m3 includes a sub guide rail m31 and an adapter port m32. The second mold strip group n includes a mold strip n1, a mold strip n2, and a mold strip n3, where the mold strip n1 includes a sub guide rail n11 and an adapter port n12, the mold strip n2 includes a sub guide rail n21 and an adapter port n22, and the mold strip n3 includes a sub guide rail n31 and an adapter port n32, and the third mold strip group d includes a mold strip d1, a mold strip d2, and a mold strip d3, where the mold strip d1 includes a sub guide rail d11 and an adapter port d12, the mold strip d2 includes a sub guide rail d21 and an adapter port d22, and the mold strip d3 includes a sub guide rail d31 and an adapter port d32. In this case, the sub guide rail m11, the sub guide rail n11, and the sub guide rail d11 form a crawling guide rail. Similarly, the sub guide rail m21, the sub guide rail n21, and the sub guide rail d21 form a crawling guide rail, and the sub guide rail m31, the sub guide rail n31, and the sub guide rail d31 form a crawling guide rail.

It is assumed that the source adapter port is the adapter port n12 of the mold strip n1 of the second mold strip group n, that the target adapter port is the adapter port d12 of the mold strip d1 of the third mold strip group d3, and that the fiber patch cord apparatus 601 is currently located on the sub guide rail m11 of the mold strip m1 of the first mold strip group m.

As shown in FIG. 23, after the second mold strip group n receives, using a network port M, the control information sent by the controller 603, the second mold strip group n can move on the guide post 6022 along the first direction, such that the adapter port n12 of the mold strip n1 of the second mold strip group n is aligned with the sub guide rail m11 of the mold strip m1 of the first mold strip group m, and then the fiber patch cord apparatus 601 pulls, along a third direction, the fiber patch cord out of the source adapter port.

Figure 24:
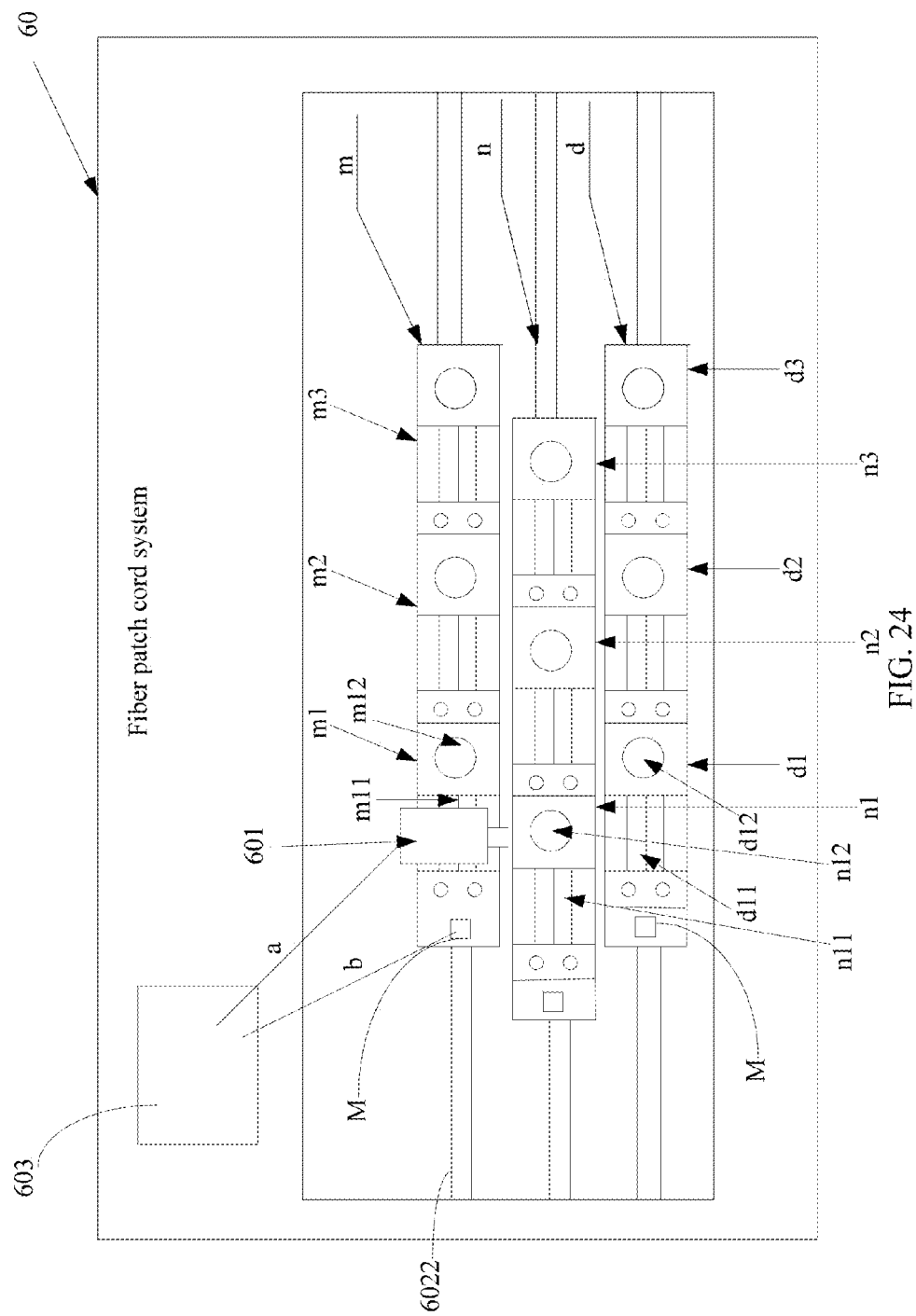
FIG. 24 is schematic diagram 2 of a fiber patch cord process of a fiber patch cord system according to an embodiment of the present disclosure.

Then, as shown in FIG. 24, the second mold strip group n may move again on the guide post 6022 along the first direction according to the control information, such that the sub guide rail n11 of the mold strip n1 of the second mold strip group n is aligned with the sub guide rail m11 of the mold strip m1 of the first mold strip group m, to form a crawling guide rail. In addition, after the third mold strip group d receives, using the network port M, the control information sent by the controller 603, the third mold strip group d may move on the guide post 6022 along the first direction such that the adapter port d12 of the mold strip d1 of the third mold strip group d is aligned with the sub guide rail n11 of the mold strip n1 of the second mold strip group n.

Figure 25:
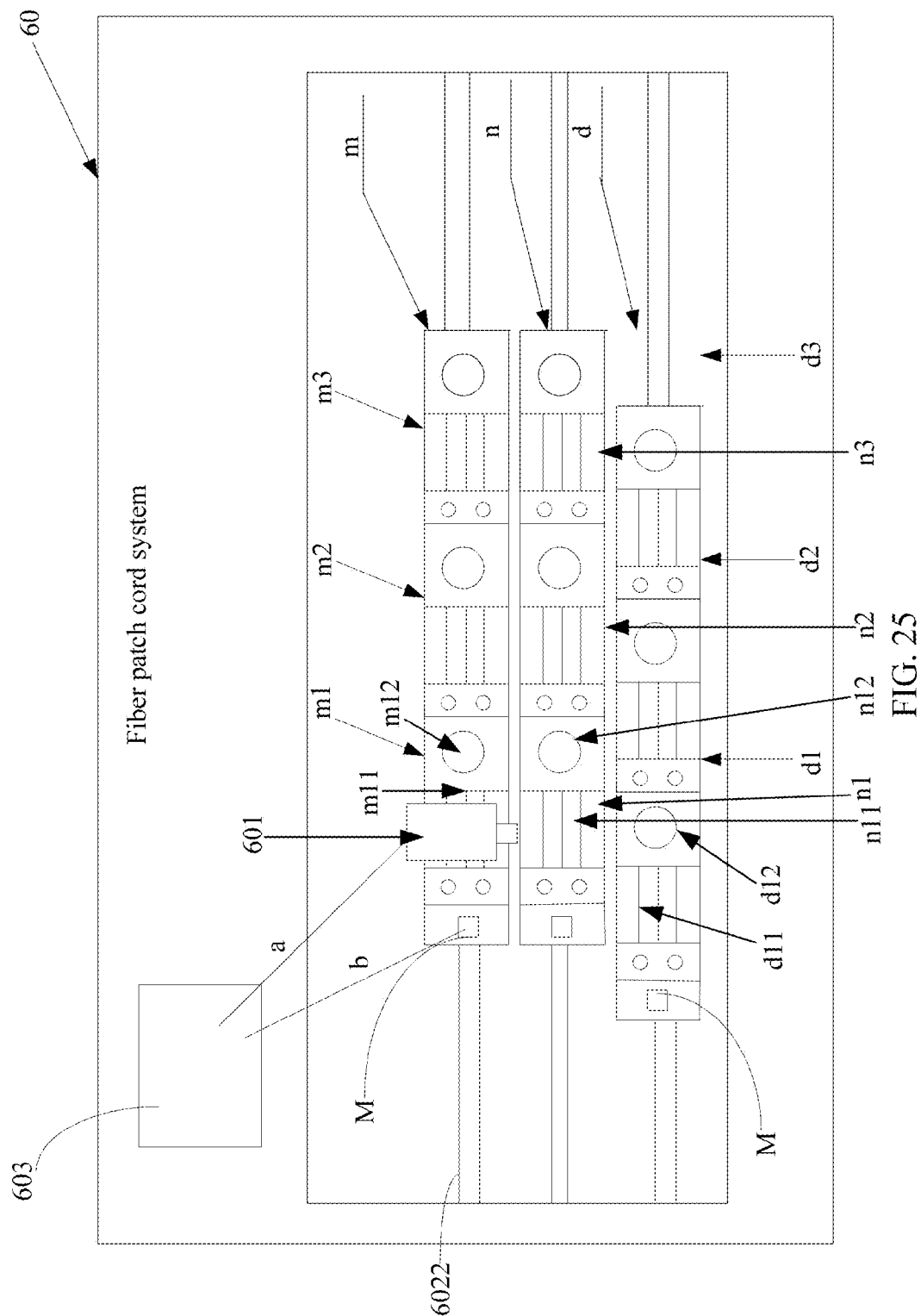
FIG. 25 is schematic diagram 3 of a fiber patch cord process of a fiber patch cord system according to an embodiment of the present disclosure.
Figure 26:
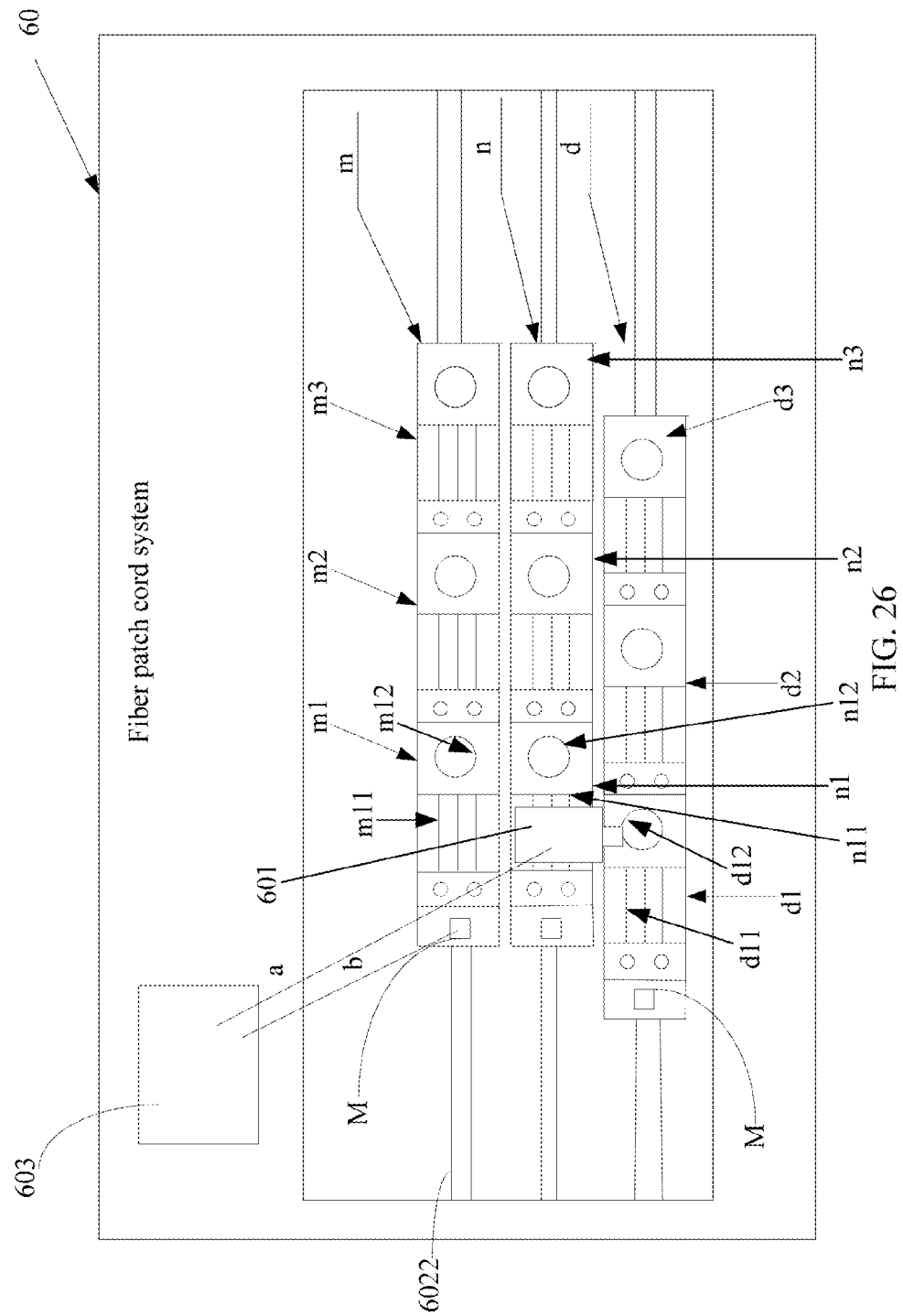
FIG. 26 is schematic diagram 4 of a fiber patch cord process of a fiber patch cord system according to an embodiment of the present disclosure.

Finally, as shown in FIG. 25, after the fiber patch cord apparatus 601 receives, using the wire a, the crawling path information sent by the controller 603, the fiber patch cord apparatus 601 may move to the sub guide rail n11 of the mold strip n1 of the second mold strip group n along the second direction, and then the fiber patch cord apparatus 601 inserts, along the third direction, the fiber patch cord into the target adapter port.

It should be noted that, the second direction is perpendicular to the first direction, and the first direction is a row direction or a column direction, where the row direction is a direction parallel to a placement surface when the fiber distribution terminal is normally placed, and the column direction is a direction perpendicular to the placement surface when the fiber distribution terminal is normally placed, and the third direction is a direction perpendicular to a plane constituted by the first direction and the second direction.

In addition, the fiber patch cord process of the fiber patch cord system provided in this embodiment of the present disclosure is only exemplarily described, and is not limited. A specific fiber patch cord process based on a patching path algorithm is the same as that in the prior art, and details are not provided herein again.

A fiber patch cord apparatus provided by the embodiments of the present disclosure includes a crawling unit configured to move to a corresponding position of a source adapter port along a crawling guide rail provided by a port panel, a clamping unit configured to clamp a fiber patch cord on the source adapter port, and a pulling and insertion unit configured to pull the fiber patch cord out of the source adapter port, or insert the fiber patch cord into a target adapter port. The port panel includes at least two mold strip groups and at least two guide posts, where each of the guide posts is connected to the mold strip group, such that the mold strip group can be controlled by a controller to move on the guide post connected to the mold strip group. In this way, the fiber patch cord apparatus and the port panel coordinate with each other, such that a structure of a fiber patch cord system by which a fiber patch cord is automatically pulled out of or inserted into an adapter port disposed on the port panel is simplified.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A fiber patch cord apparatus, comprising:
   a crawler configured to move to a corresponding position of a source adapter port along a crawling guide rail provided by a port panel;
   a clamper coupled to the crawler and configured to clamp a fiber patch cord on the source adapter port; and
   a puller and inserter coupled to the clamper and configured to pull the fiber patch cord out of the source adapter port,
   wherein the crawler is further configured to move to a corresponding position of a target adapter port along the crawling guide rail provided by the port panel,
   wherein the puller and inserter is further configured to insert the fiber patch cord into the target adapter port,
   wherein the fiber patch cord apparatus is located on the port panel,
   wherein the crawling guide rail is formed by connecting a sub guide rail on a first mold strip to a sub guide rail on at least one mold strip adjacent to the first mold strip in a second direction,
   wherein the first mold strip is any mold strip in at least two mold strip groups arranged in an array on the port panel along a first direction,
   wherein each of the mold strip groups can move along the first direction,
   wherein each of the mold strip groups comprises at least two mold strips arranged in an array along the second direction,
   wherein an adapter port is disposed on each of the mold strips,
   wherein the second direction is perpendicular to the first direction,
   wherein the crawler comprises:
      a crawling gear, wherein the crawling gear is engaged with a drive rack arranged in an array on the crawling guide rail along the second direction;
      a slicing structure connected to the crawling gear, wherein the sliding structure is in contact with a guiding guide rail on the crawling guide rail, and wherein a guiding direction of the guiding guide rail is parallel to the second direction;
a drive worm; and
a crawling motor, wherein the crawling motor is connected to the crawling gear using the drive worm and is configured to:
drive the crawling gear to be engaged with the drive rack; and
drive the sliding structure to move along the guiding direction of the guiding guide rail, and
wherein the sliding structure comprises:
at least two ball groups, wherein balls in each of the ball groups are arranged in a linear array along the second direction; and
a first elastic element connected to the ball is disposed corresponding to any ball in a first ball group such that the ball is in elastic contact with the guiding guide rail, wherein the first ball group is at least one ball group in the two ball groups.

2. The fiber patch cord apparatus according to claim 1, wherein the clamper comprises:
a clamping element, wherein the clamping element is provided with a screw hole and a first opening that has a chamfer;
a bolt, wherein the bolt is connected to the clamping element using the screw hole;
a clamping motor, wherein the clamping motor drives, using the bolt, the clamping element to move along a direction parallel to the second direction; and
a clamping jaw, wherein a second elastic element is disposed on the clamping jaw, wherein the second elastic element provides an elastic force parallel to the first direction for the clamping jaw, wherein the clamping element is sleeved on the clamping jaw by means of the first opening, and wherein when the clamping element moves along the direction parallel to the second direction to make a contact area between the first opening and the clamping jaw gradually increase, the clamping jaw is driven by an elastic force of the first opening to perform clamping.

3. The fiber patch cord apparatus according to claim 1, wherein the clamper comprises:
a clamping element, wherein the clamping element is provided with a screw hole and a first opening that has a chamfer;
a bolt, wherein the bolt is connected to the clamping element using the screw hole;
a clamping motor, wherein the clamping motor drives, using the bolt, the clamping element to move along a direction parallel to the second direction; and
a clamping jaw, wherein a second elastic element is disposed on the clamping jaw, wherein the second elastic element provides an elastic force parallel to the first direction for the clamping jaw, wherein the clamping element is sleeved on the clamping jaw by means of the first opening, wherein when the clamping element moves along the direction parallel to the second direction to make a contact area between the first opening and the clamping jaw gradually decrease, the clamping jaw is driven by an elastic force of the first opening to spread.

4. The fiber patch cord apparatus according to claim 2, wherein the puller and inserter comprises:
a sliding element connected to the clamping jaw;
a rotating shaft connected to the sliding element;
a first bevel gear connected to the rotating shaft;
a second bevel gear engaged with the first bevel gear; and
a pulling and insertion motor connected to the first bevel gear using the second bevel gear and configured to:
drive the second bevel gear to be engaged with the first bevel gear; and
drive the rotating shaft to rotate in order to enable the sliding element to slide on the rotating shaft, thereby driving the clamping jaw connected to the sliding element to pull or insert, along a third direction, the fiber patch cord, wherein the third direction is a direction perpendicular to a plane constituted by the first direction and the second direction.

5. The fiber patch cord apparatus according to claim 1, comprising a radio frequency identification read head configured to read information about a radio frequency identification label on a fiber patch cord of an adapter port on the mold strip group.

6. The fiber patch cord apparatus according to claim 1, wherein the crawling motor is connected to a controller, and is configured to:
receive crawling path information sent by the controller; and
control, according to the crawling path information, the fiber patch cord apparatus to move on the crawling guide rail.

* * * * *